United States Patent
Allen et al.

(10) Patent No.: US 9,677,688 B1
(45) Date of Patent: Jun. 13, 2017

(54) FAIRING HAVING AN OFFSET OPENING

(71) Applicant: VIV Solutions LLC, Richmond, TX (US)

(72) Inventors: Donald Wayne Allen, Richmond, TX (US); Jeffrey Robert Dupuis, Houston, TX (US); Julie Ann Dehne, Cypress, TX (US)

(73) Assignee: VIV Solutions LLC, Richmond, TX (US)

( * ) Notice: Subject to any disclaimer, the term of this patent is extended or adjusted under 35 U.S.C. 154(b) by 0 days.

(21) Appl. No.: 15/171,823

(22) Filed: Jun. 2, 2016

Related U.S. Application Data

(60) Provisional application No. 62/170,102, filed on Jun. 2, 2015, provisional application No. 62/295,482, filed on Feb. 15, 2016.

(51) Int. Cl.
*F15D 1/10* (2006.01)
*F16L 1/12* (2006.01)
(Continued)

(52) U.S. Cl.
CPC .............. *F16L 1/123* (2013.01); *E21B 17/01* (2013.01); *F15D 1/10* (2013.01); *B63B 21/663* (2013.01); *B63B 2021/504* (2013.01)

(58) Field of Classification Search
CPC ... B63B 21/663; B63B 2021/504; F16L 1/123
See application file for complete search history.

(56) References Cited

U.S. PATENT DOCUMENTS

| 4,075,967 A | 2/1978 | Silvey |
| 4,398,487 A | 8/1983 | Ortloff et al. |
| (Continued) | | |

FOREIGN PATENT DOCUMENTS

| EP | 0096956 | 12/1983 | | |
| GB | 108761 A | * 8/1917 | ........... | B63B 21/663 |
| (Continued) | | | | |

OTHER PUBLICATIONS

Allen, et al., "Comparisons of Various Fairing Geometries for Vortex Suppression at High Reynolds Numbers", *OTC 19377*, 2008 Offshore Technology Conference, Houston, Texas, (May 5-8, 2008), 16 pages.

*Primary Examiner* — Benjamin Fiorello
(74) *Attorney, Agent, or Firm* — Blakely Sokoloff Taylor & Zafman LLP

(57) ABSTRACT

A fairing having a fairing body having a nose dimensioned to partially encircle an underlying tubular and having a fairing body axis; a stand-off region extending radially outward from the nose, wherein the stand-off region comprises a first side wall extending from one side of the nose and a second side wall extending from another side of the nose and toward the first side wall; a tail flange extending radially outward from the stand-off region, the tail flange having a substantially planar member comprising a first portion adjacent the stand-off region and a second portion radially outward to the first portion; and an opening formed within one of the nose or the stand-off region, wherein the opening is parallel to the fairing body axis and the opening is modifiable between an open configuration and a closed configuration.

13 Claims, 21 Drawing Sheets

(51) Int. Cl.
*E21B 17/01* (2006.01)
*B63B 21/50* (2006.01)
*B63B 21/66* (2006.01)

(56) References Cited

U.S. PATENT DOCUMENTS

| | | | | |
|---|---|---|---|---|
| 5,410,979 A | * | 5/1995 | Allen | B63B 21/502 |
| | | | | 114/243 |
| 5,738,034 A | | 4/1998 | Wolff et al. | |
| 5,984,584 A | | 11/1999 | McMillan et al. | |
| 6,010,278 A | * | 1/2000 | Denison | B63B 21/502 |
| | | | | 114/243 |
| 6,048,136 A | * | 4/2000 | Denison | E21B 17/01 |
| | | | | 114/243 |
| 6,067,922 A | * | 5/2000 | Denison | B63B 21/663 |
| | | | | 114/243 |
| 6,179,524 B1 | * | 1/2001 | Allen | B63B 21/502 |
| | | | | 114/263 |
| 6,223,672 B1 | * | 5/2001 | Allen | B63B 21/502 |
| | | | | 114/243 |
| 6,244,204 B1 | * | 6/2001 | Weyman | B63B 21/663 |
| | | | | 114/243 |
| 6,896,447 B1 | * | 5/2005 | Taquino | F15D 1/10 |
| | | | | 114/243 |
| 7,337,742 B1 | | 3/2008 | Masters et al. | |
| 7,467,913 B1 | * | 12/2008 | Allen | B63B 35/4413 |
| | | | | 405/195.1 |
| 7,513,209 B2 | | 4/2009 | Masters et al. | |
| 7,934,888 B2 | * | 5/2011 | Masters | F16L 1/123 |
| | | | | 405/216 |
| 8,523,492 B2 | * | 9/2013 | Baugh | B63B 21/502 |
| | | | | 114/243 |
| 9,080,610 B1 | * | 7/2015 | West | E02D 5/60 |
| 2002/0134553 A1 | | 9/2002 | Woodrow | |
| 2004/0175240 A1 | * | 9/2004 | McMillan | F15D 1/10 |
| | | | | 405/211 |
| 2005/0254903 A1 | * | 11/2005 | McMillan | F16L 1/20 |
| | | | | 405/216 |
| 2006/0021560 A1 | * | 2/2006 | McMillan | E21B 17/01 |
| | | | | 114/221 R |
| 2007/0104542 A1 | * | 5/2007 | Somerville | B63B 21/663 |
| | | | | 405/224.1 |
| 2007/0215028 A1 | | 9/2007 | Lie | |
| 2008/0025800 A1 | * | 1/2008 | Watkins | B63B 21/502 |
| | | | | 405/216 |

FOREIGN PATENT DOCUMENTS

| | | |
|---|---|---|
| WO | WO-2014166543 | 10/2014 |
| WO | WO-2016080828 | 5/2016 |

* cited by examiner

FAIRING HAVING AN OFFSET OPENING

CROSS-REFERENCE TO RELATED APPLICATIONS

The application is a non-provisional application of co-pending U.S. Provisional Patent Application No. 62/170,102, filed Jun. 2, 2015 and U.S. Provisional Patent Application No. 62/295,482, filed Feb. 15, 2016, both of which are incorporated herein by reference.

FIELD

A fairing having an offset opening, more specifically, a fairing having an opening within a stand-off region or a nose region. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression.

Fairings are a popular VIV suppression device. Fairings are placed around a tubular (on a collar that clamps to the tubular to restrain the fairing from sliding along the tubular's longitudinal axis more than desired) and are free to rotate (weathervane) with changes in current direction.

Present fairings utilize a design that is split in the tail (e.g., along the tail axis). During installation, the fairing is placed around the tubular and the tail sections are aligned and fastened at several locations to keep the fairing closed around the tubular. In some cases, there are several internal support blocks that also must be fastened to the tubular after the fairing is placed around the tubular. This design means that numerous fasteners must be installed to close the fairing around the tubular and have it sufficiently supported by the internal blocks. The result is that the installation can be quite time consuming. Since installation vessels have very high day rates, the cost of installing fairings can be substantial.

In addition, the internal support blocks are often cut from a sheet of material or injection molded and can therefore be slow to manufacture. In addition, they add a significant component to the overall fairing cost. Moreover, in order to function properly, it is important that the fairings be free to rotate with changes in current direction. Marine growth, however, can inhibit this rotation.

SUMMARY

The present invention is directed to fairings having offset openings and other insert and fastening mechanisms that allow for quick installation. Representatively, in one embodiment, the fairing includes an opening that is considered offset because it is within a body portion, as opposed to a tail portion, of the fairing. In another embodiment, the fairing includes an opening which is offset in that it is within the nose portion of the fairing. In addition, various insert members for positioning within a stand-off region of the fairing (e.g. between the nose and the tail) and fastening mechanisms for quickly closing the fairing opening and/or attaching the fairing sidewalls to the insert members are disclosed.

Representatively, in one embodiment, the invention is directed to a fairing having a fairing body with a nose dimensioned to partially encircle an underlying tubular and having a fairing body axis. A stand-off region extends radially outward from the nose. The stand-off region includes a first side wall extending from one side of the nose and a second side wall extending from another side of the nose and toward the first side wall. A tail flange extends radially outward from the stand-off region, the tail flange includes a substantially planar member having a first portion adjacent the stand-off region and a second portion radially outward to the first portion. An opening is formed within one of the nose or the stand-off region. The opening opening is parallel to the fairing body axis and the opening is modifiable between an open configuration and a closed configuration. In one embodiment, the opening is formed between the first side wall and the second side wall of the stand-off region. In still further embodiments, the first side wall and the second side wall form a substantially triangular shaped channel along an underlying tubular around which the nose is positioned. The fairing may also include an insert member dimensioned to be inserted within the channel of the stand-off region. The insert member may be a solid block. Alternatively, the insert member may include a V shaped structure having a first arm and a second arm having ends that join to form an apex, and an outer surface of the first arm and the second arm rest along an inner surface of the stand-off region which faces the underlying tubular. In another embodiment, the insert member comprises a V shaped structure having an apex, and wherein the first portion of the substantially planar member is attached to the V shaped structure at the apex. In still further embodiments, the insert member includes a base member and a first arm member and a second arm member that extend from the base member toward one another, and wherein the base member rests along the underlying tubular when the nose of the fairing body is positioned along an underlying tubular. In addition, a fastener assembly for closing the opening may be provided; the fastener assembly may be configured to secure at least one of the first side wall or the second side wall to the insert member to close the opening. In one embodiment, the fastener assembly may include a bracket attached to an inner surface of at least one of the first side wall or the second side wall and the insert member comprises a bracket opening formed therein, and the bracket opening is dimensioned to receive the bracket and a pin for securing the bracket within the opening. In another embodiment, the fastener assembly may include a pin having a first end dimensioned to be received within a slot in the insert member and a second end dimensioned for insertion through at least one of the first side wall or the second side wall, and the second end may include a laterally orientated channel through which a cross-pin is inserted once the second end is inserted through the at least one of the first side wall or the second side wall. In another embodiment, the fairing opening is formed within the nose. In this embodiment, a fastener assembly for holding the opening in the closed configuration is provided and the fastener assembly includes a latching member and a receiving member for receiving and holding the latching member therein. In still further embodiments, the latching member includes a bar rotatably attached to a section of the fairing along one side of the opening and a latch head positioned at an end of the bar and the receiving member includes a housing attached to a section of the fairing along another side of the opening, the housing defining a receptacle dimensioned to receive and hold the bar and latch head therein. In another embodiment, the latching member includes a serrated pin and a pin housing through which the serrated pin is operable to be advanced, the pin housing is attached to a section of the fairing along one side of the opening and the receiving member includes a pin receiving member attached to a section of the fairing along another side of the opening, the pin receiving member dimensioned to receive and retain the serrated pin therein.

In another embodiment, a vortex-induced vibration (VIV) suppression device is disclosed which includes a fairing having a body portion and a tail flange extending radially outward from the body portion, and the body portion is dimensioned to encircle an underlying tubular. The device further includes an insert member dimensioned to be positioned within the body portion and space the body portion from an underlying tubular around which the body portion is positioned. An axially aligned opening is formed in the body portion, and the opening is modifiable between an open configuration and a closed configuration. A fastener adapted to hold the axially aligned opening in the closed configuration when the body portion is positioned around an underlying tubular is further disclosed. The axially aligned opening may be formed in a portion of the body portion adjacent the tail flange. In another embodiment, the body portion includes a nose and a tapered section extending from the nose to the tail flange, and the axially aligned opening is formed in the nose. The fastener may include a fastening member dimensioned to be inserted through the body portion and into the insert member such that the body portion is directly attached to the insert member. In another embodiment, the fastener may include a latch rotatably attached to one side of the body portion and a receptacle attached to another side of the body portion, and wherein the latch is inserted into the receptacle to hold the axially aligned opening in the closed position.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
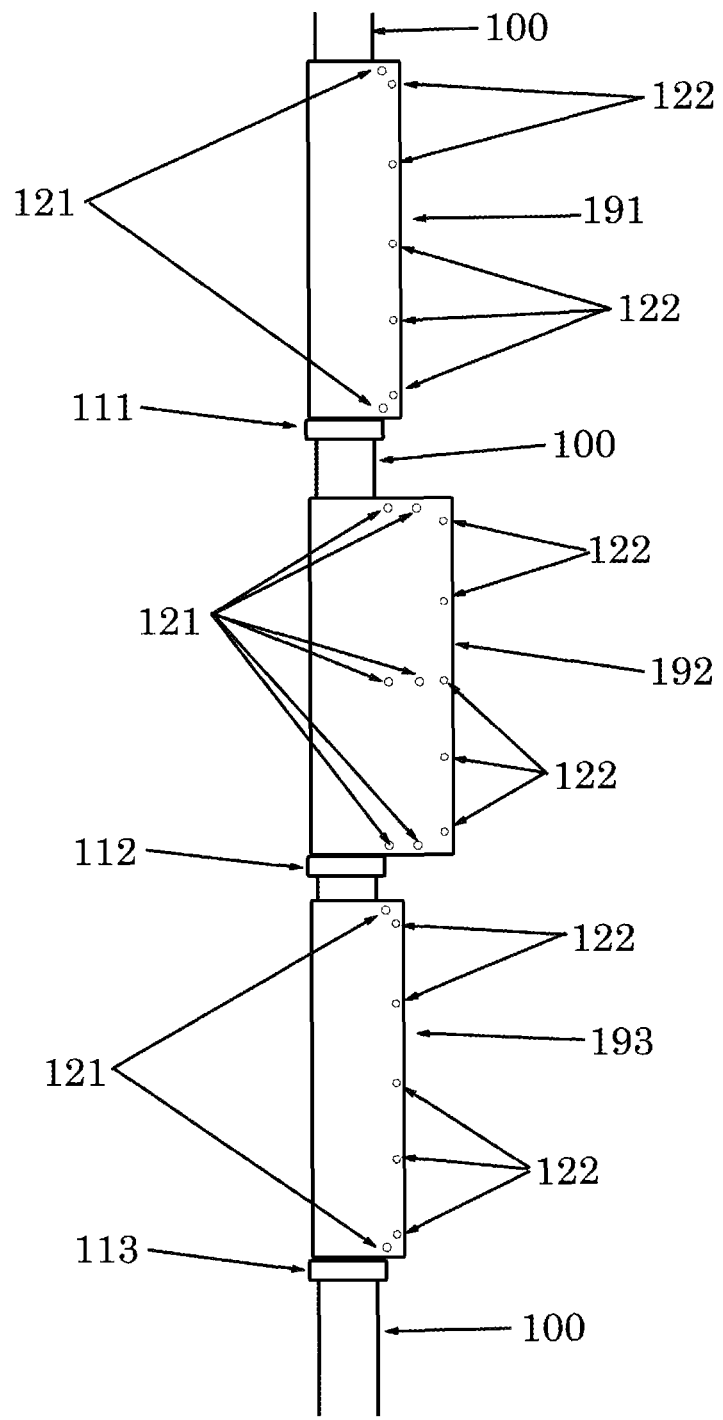
FIG. 1A is a side view of a tubular fitted with conventional fairings of different sizes.

Referring now to the invention in more detail, FIG. 1A shows a fairing-collar system including fairings 191, 192, and 193 supported by collars 111, 112, and 113 on tubular 100. Fasteners 121 and tail fasteners 122 are also shown on each fairing.

Again referring to FIG. 1A, fairings 191, 192 and 193 are free to rotate around tubular 100 while collars 111, 112, and 113 are clamped tight against tubular 100. In other words, fairings 191, 192, 193 rotate with respect to tubular 100 and collars 111, 112 and 113. Fasteners 121 may be used to attach the fairings 191, 192 and 193 to an internal support block while tail fasteners 122 may be used to attach one side of the fairing tail to the opposite side of the fairing tail.

Still referring to FIG. 1A, fairings 191 and 193 are shown to be of a different size than fairing 192, illustrating that fairings 191, 192, and 193 may be of any suitable size or shape.

Figure 1B:
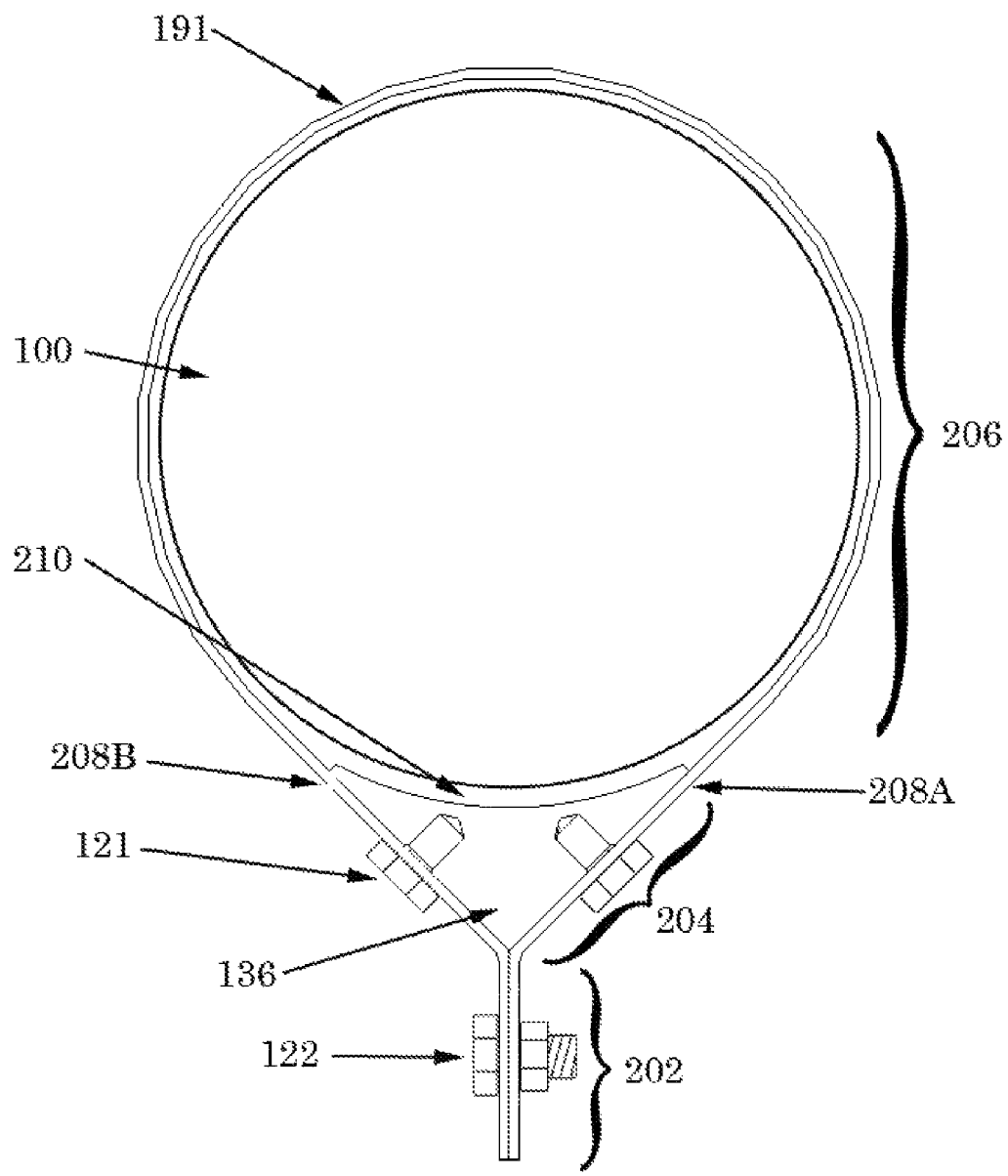
FIG. 1B is a top view of the conventional fairing of FIG. 1A.

Referring now to FIG. 1B, FIG. 1B illustrates a top end view of one of fairings 191, 192 and 193, for example, fairing 191 in FIG. 1A. Fairing 191 may be constructed using a single piece of plastic that is formed into the desired shape (e.g. a tear drop shape). For example, fairing 191 may include a body portion which includes a nose 206 dimensioned to partially encircle the tubular 100 and a stand-off portion 204 which includes side walls 208A, 208B that extend from the nose 206 toward one another to form a channel 210 between the fairing 191 and tubular 100. In one embodiment, fairing 191 may be fastened together by tail fastener(s) 121 through tail 202 and fasteners 122 may be used to attach fairing 191 to insert member 136. Insert member 136 may be used to provide structural support to fairing 191 and between fairing 191 and the underlying tubular 100.

Again referring to FIG. 1B, this embodiment illustrates the use of fastener 122 through tail 202, which are to be installed during installation. Since fasteners 121 must also be installed during installation, there can be a large number of fasteners to install when fairing 191 is installed around tubular 100. This can make installation slow.

Referring now to FIG. 2-FIG. 11, FIG. 2-FIG. 11 illustrate various embodiments of a fairing having an offset opening that is adjacent the fairing tail and therefore, in some embodiments, fasteners 122 through tail 202 may be omitted, resulting in a more efficient and expedient installation process.

Figure 2:
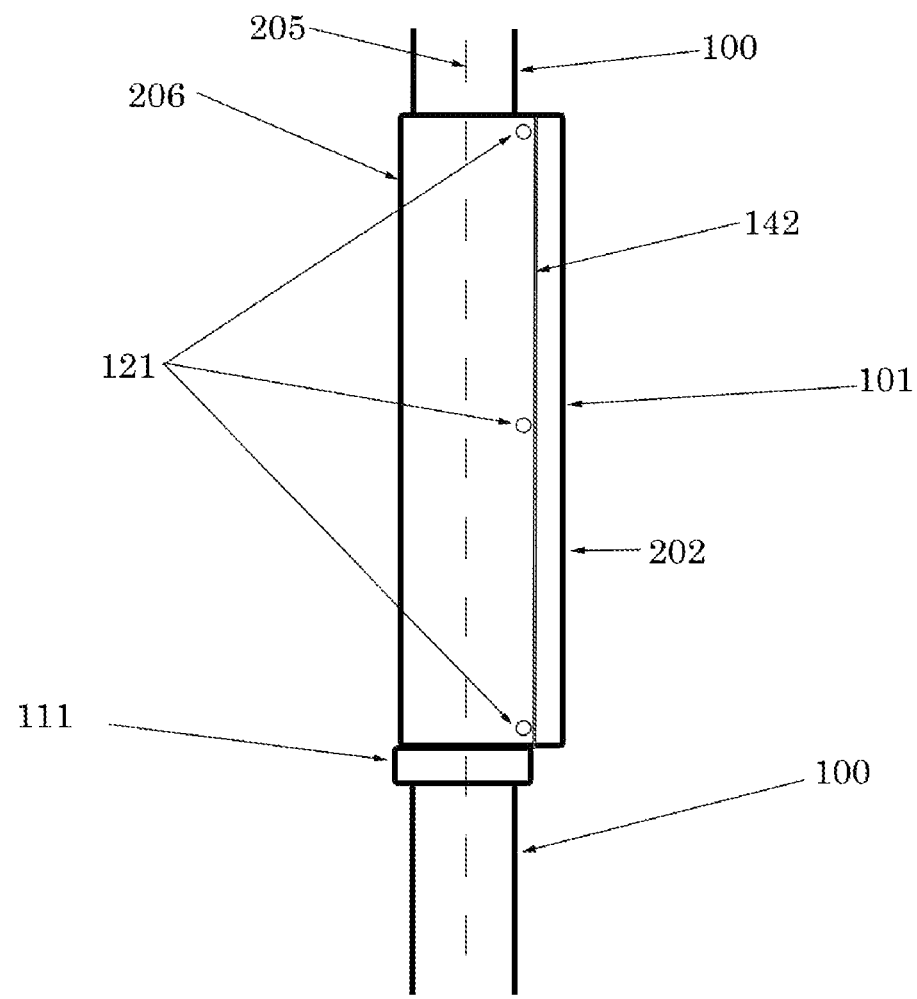
FIG. 2 is one embodiment of a tubular fitted with a fairing having an offset opening.

Referring now to FIG. 2, FIG. 2 illustrates one embodiment of fairing 101 around tubular 100 and collar 111 installed onto tubular 100. Fasteners 121 are shown on fairing 101 and an opening 142 is shown in fairing 101.

Again referring to FIG. 2, opening 142 is placed so that fairing 101 may be opened and placed around tubular 100 without the need for the fasteners 122 shown in FIG. 1A-1B. Rather, fasteners 121 alone are used to attach the fairings to an insert member and, in this case, close the fairing around tubular 100 so that it is secure.

Still referring to FIG. 2, fairing 101 may be of any suitable shape but will have an opening 142 that is not in the tail so that fasteners through the tail are not needed or required in order to close or secure fairing 101 around tubular 100. In other words, the opening 142 is not along the tail axis, or within tail 202, such that it splits the tail in half. Rather, the tail is one single integrally formed and inseparable structure. Opening 142 will be such that, when fasteners 121 are installed, the fairing is secure from opening and coming off of tubular 100. In addition, opening 142 may be considered an axially aligned opening in that it extends in a direction parallel to the axis 205 of fairing 101 (as opposed to, for example, a helical opening which extends around a cylindrical member). Fasteners 121 may be of any suitable size, shape and quantity (any number of blocks may be used in fairing 101—typically 1-5 blocks will be used). Opening 142 may be of any suitable size and shape. For example, opening 142 may be straight as shown in FIG. 2, but may also be diagonal, curved, zig-zag, or any combination thereof. More than one opening 142 may be present, but most often a single opening 142 will be present and it will be near an internal block or support.

Still referring to FIG. 2, fairing 101 and fasteners 121 may be made of the same material or of different materials. Fairing 101 and fasteners 121 may be made of any suitable material including, but not limited to, metal, plastic, fiberglass or other composite, rubber or elastomer, and wood.

Figure 3:
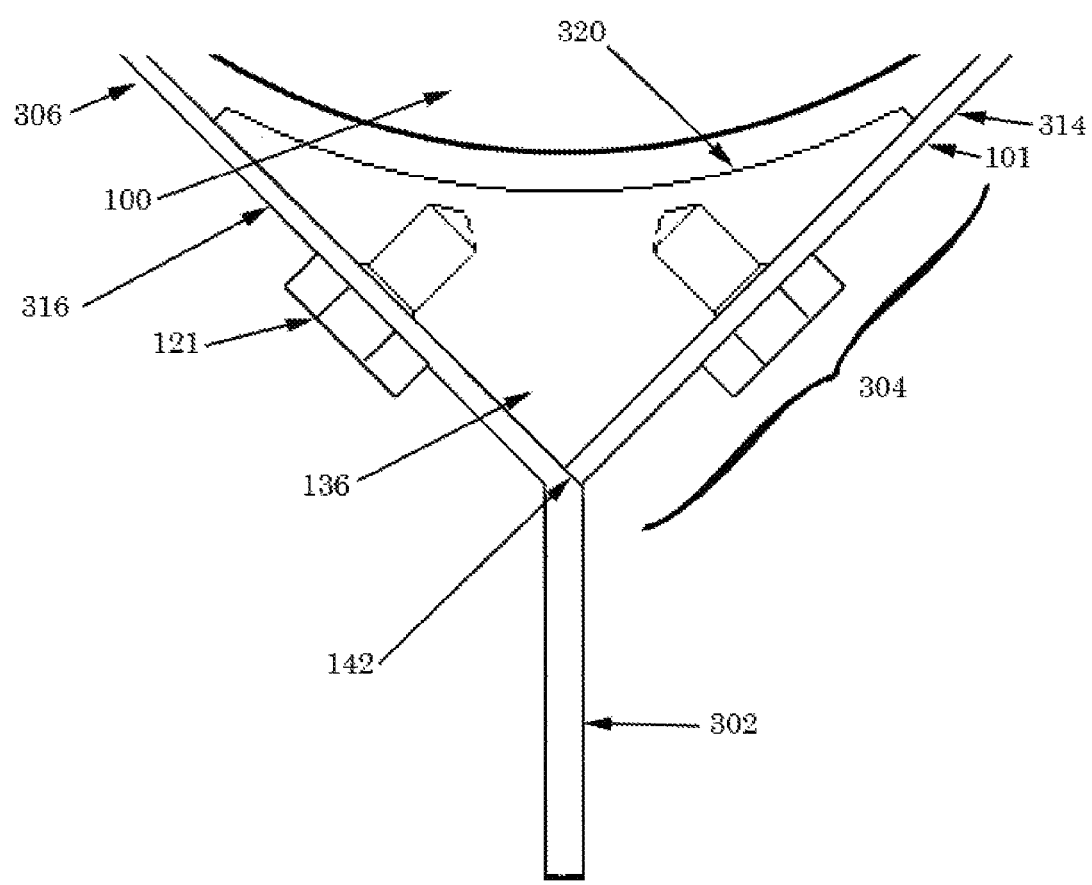
FIG. 3 is a top view of another embodiment of a fairing having an offset opening.

Referring now to FIG. 3, FIG. 3 illustrates a top end view of fairing 101 of FIG. 2 in which one embodiment of a side-installed fairing configuration is shown. In one embodiment, opening 142 is where the fairing interfaces with itself, for example, within stand-off region 304 near a base of tail 302. For example, stand-off region 304 is formed by a first side wall 314 and a second side wall 316 that extend from the fairing nose 306 toward one another such that a triangular shaped channel 320 is formed by the stand-off region 304. Opening 142 is formed between ends of the first side wall 314 and the second side wall 316, near a base of the tail 302. It should be understood that as used herein, the "nose" (e.g., nose 306) refers to the portion of fairing 101 that is formed by the curved wall of the fairing that encircles and can come into contact with an underlying tubular, and the "stand-off region" (e.g., region 304) refers to the substantially straight portions of the fairing which extend from the curved portion and form a triangular channel along the tubular. In addition, the "tail" (e.g., tail 302) refers to the portion of the fairing that extends from the "stand-off region" and in a direction substantially perpendicular to an outer surface of the underlying tubular and/or is aligned parallel to the tubular axis.

Fasteners 121 are further shown used to hold opening 142 of fairing 101 in the closed configuration as shown when they are installed through sidewall 314 or 316 of the stand-off region 304 into insert member 136. Moreover, since tail 302 is a single inseparable structure, additional fasteners through the tail are not required or necessary to hold the tail closed. In this aspect, insert member 136 serves as both an internal support and a structure for closing fairing 101 around tubular 100 and additional fasteners through the tail can be omitted. In one embodiment, insert member 136 may be a solid block positioned within channel 320 of stand-off region 304. Note that while FIG. 3 shows the tail 302 as a tail flange (the bottom of the fairing in FIG. 2) consisting of a single piece, the tail flange may also look similar to that of FIG. 1B and fairing 101 may look like the fairing in FIG. 1B but with a cut creating opening 142 as shown in FIG. 3 (stating this more broadly, any part of fairing 101 may have pieces of plastic attached to it by any suitable means).

Again referring to FIG. 3, insert member 136 may be of any suitable size and shape and may extend the entire length of fairing 101 (into the page) or extend only a short distance (typically enough to support fasteners 121). Insert member 136 may extend further into the fairing on one side than the other (i.e. insert member 136 may extend further into the fairing for one fastener 121 than the other fastener 121, or one fastener 121 may be installed at a different location along the fairing axis than the opposite fastener 121). Insert member 136 may be made of any suitable material including, but not limited to, metal (including copper), plastic, fiberglass or composite, or rubber/elastomer. Opening 142 may be located anywhere on the fairing body, but is preferably located within the nose 306 or the stand-off region 304 near the tail 302 of the fairing to avoid disruption of the flow around the fairing.

Figure 4:
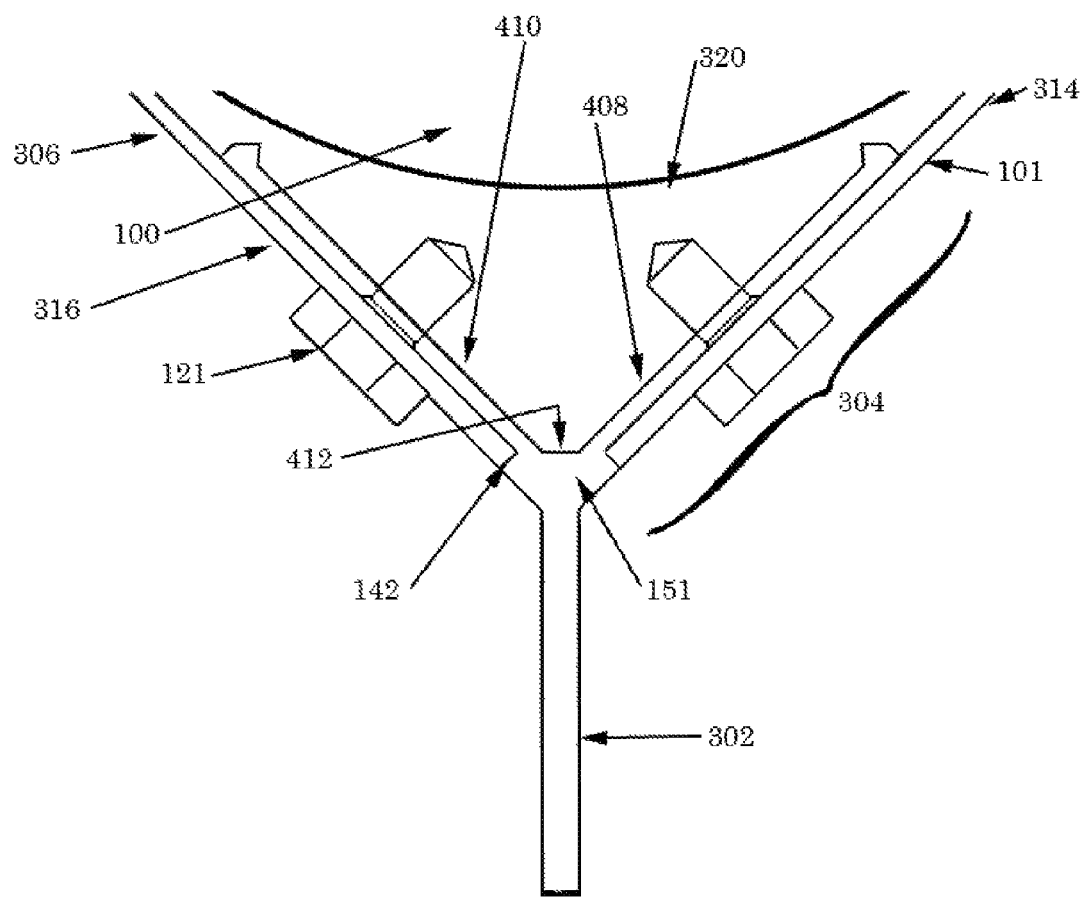
FIG. 4 is a top view of another embodiment of a fairing having an offset opening and separate tail member.

Referring now to FIG. 4, this figure shows a close-up top view of fairing 101 installed around tubular 100 with fasteners 121 engaged into insert member 151. In one embodiment, insert member 151 may include both the fairing tail 302 as well as an internal support member within the stand-off region 304 of the fairing body portion. Representatively, in one embodiment, insert member 151 may include a first arm member 408 and a second arm member 410 that meet at apex 412 to form a "V" shaped structure. The tail 302 may be attached to, and extend from, apex 412 in a direction away from the underlying tubular 100. In other words, the first arm member 408, second arm member 410 and tail 302 may be one integrally formed piece. The stand-off region 304 may further include a first side wall 314 and a second side wall 316 that extend from the nose 306 of fairing 101 toward one another to form a triangular shaped channel 320 between stand-off region 304 and tubular 100. An opening 142 is formed between the ends of first side wall 314 and second side wall 316. Opening 142 may be used to open and close the fairing 101 around tubular 100, and may also be used to accommodate tail 302 extending from insert member 151. Representatively, the first arm member 408 and second arm member 410 of insert member 151 may be positioned within channel 320 of stand-off region 304 such that the tail 302 extends through opening 142 and radially outward from the ends of first side wall 314 and second side wall 316 to form the tail 302 of fairing 101. In this aspect, the outer surface of first arm member 408 and second arm member 410 may interface and/or contact the inner surface of first side wall 314 and second side wall 316 of stand-off region 304.

In one embodiment, insert member 151 runs the entire length of the fairing, the first arm member 408 and second arm member 410 (the sections to which fasteners 121 are engaged). In other embodiments, insert member 151 runs less than the entire length of the fairing. In addition, multiple insert members may be used to form insert member 151. Fasteners 121 may consist of screws, serrated pins, bolts, rivets, etc. and may or may not utilize nuts or washers. Any number or combination of various types of fasteners 121 may be used. During operation, fasteners 121 are, for example, inserted though openings in the fairing body, for example the side walls 314, 316 of the stand-off portion 304 and arm members 408, 410 of insert member 151 to secure the two pieces together.

Still referring to FIG. 4, insert member 151 may be made of any suitable material and various components of insert member 151 or various insert members 151 used on a single fairing may, or may not, be of the same material. Insert member 151 may be made of any suitable material including, but not limited to, metal (including copper which will allow it inhibit marine growth on the fairing), plastic, fiberglass, composite, or rubber/elastomer.

Figure 5:
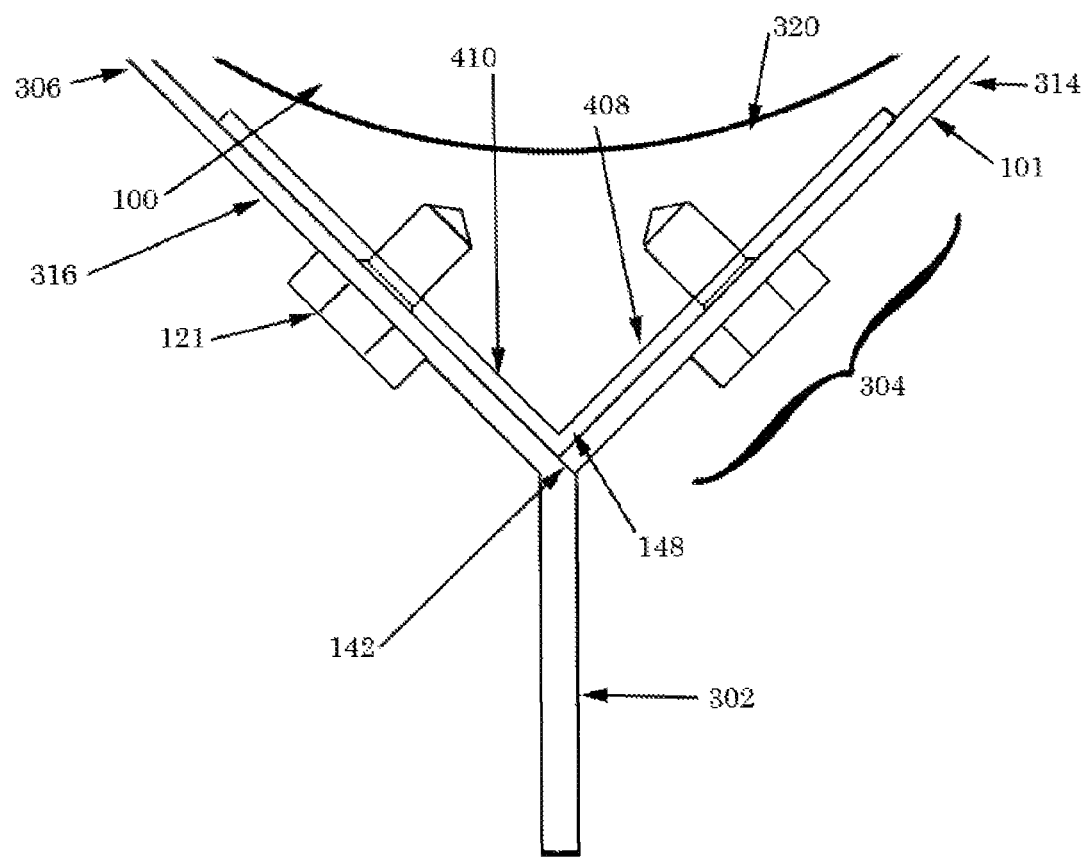
FIG. 5 is a top view of another embodiment of a fairing having an offset opening.

Referring now to FIG. 5, FIG. 5 shows another embodiment of an insert member dimensioned for insertion within the fairing stand-off region. Representatively, in this embodiment, insert member 148 includes a first arm member 408 and a second arm member 410 which form a "V" shaped structure attached to stand-off region 304 of fairing 101 using fasteners 121. In particular, similar to the previous embodiments, fairing 101 includes stand-off region 304 which includes a first side wall 314 and a second side wall 316 extending from the nose 306 of fairing 101 and forming a channel 320 between fairing 101 and tubular 100. An opening 142, as previously discussed, is formed between ends of the first side wall 314 and the second side wall 316 of stand-off region 304, near tail 302 (but not within tail 302). Fairing 101 is closed around tubular 100 at opening 142. In this embodiment, however, the tail 302 of fairing 101 is not formed as part of insert member 148. Rather, tail 302 extends from, and is integrally formed with, second side wall 316 of fairing 101.

Again referring to FIG. 5, in this embodiment, insert member 148 is shaped like a "V" but may be made in any suitable size or shape and may interface with any quantity of fasteners 121. Any quantity of insert members 148 may be used for fairing 101, and insert members 148 may be made of any suitable material including, but not limited to, metal (including copper which will allow it inhibit marine growth on the fairing), plastic, fiberglass, composite, rubber/elastomer, or combinations thereof.

Figure 6:
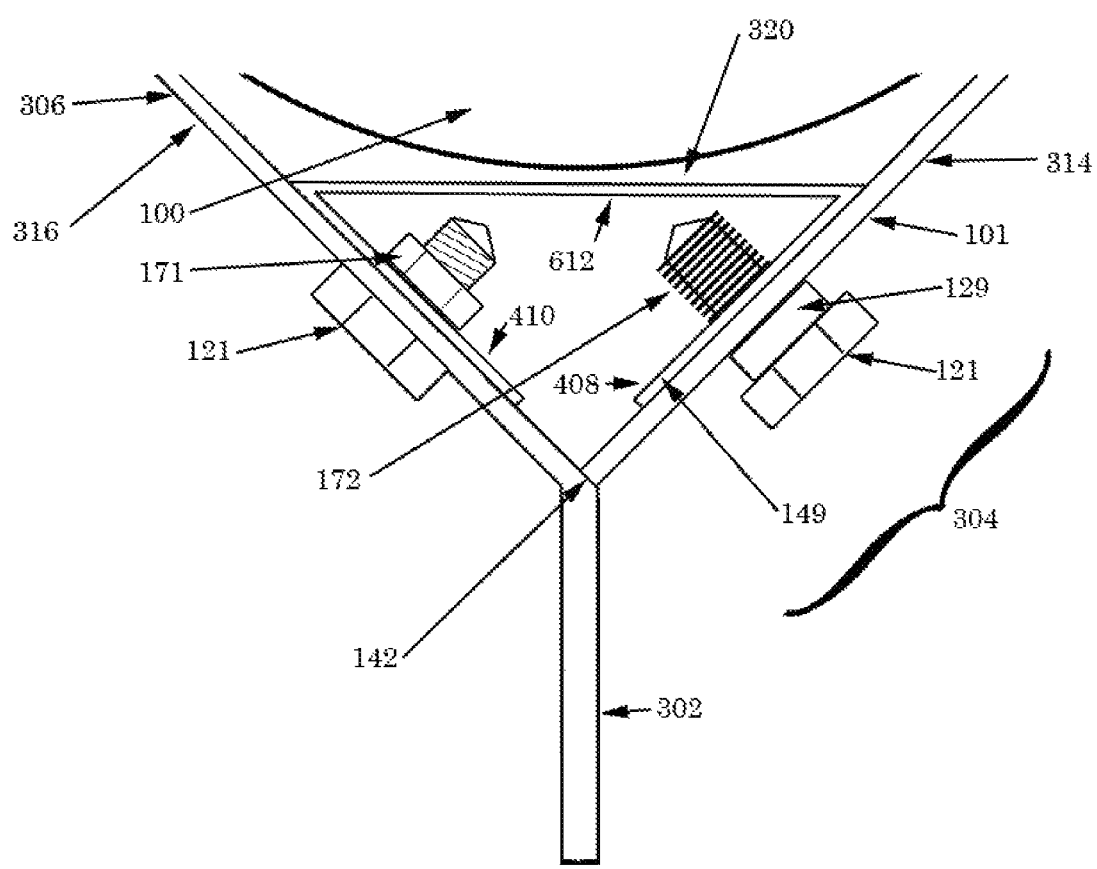
FIG. 6 is a top view of another embodiment of a fairing having an offset opening.

Referring now to FIG. 6, FIG. 6 shows another embodiment of an insert member having a different shape. For example, an inverted U-shaped bracket may be used as an insert member that is attached by a fastener on one side and a serrated spring-mounted pin on the other side. Representatively, in this embodiment, the insert member 149 includes a base member 612 and first arm member 408 and second arm member 410. Each of first arm member 408 and second arm member 410 extend from the ends of base member 612 toward one another to form a tapered or substantially triangular shaped insert member 149. The base member 612 interfaces with the underlying tubular 100 when inserted within stand-off region 304. In addition, each of the first arm member 408 and second arm member 410 are attached to side walls 314, 316, which extend from the nose region 306 toward one another to form stand-off region 304, using fasteners 121. Fairing 101 also includes a fairing tail 302 extending from stand-off region 304 as previously discussed. Fairing 101 is closed around tubular 100 at opening 142. The left fastener 121 may include a bolt and nut 171. The right fastener 121 may include a serrated pin 172 and utilizes spring 129.

Again referring to FIG. 6, the bolt and nut 171 may be pre-installed on the left side while serrated pin 172 is installed at the time fairing 101 is placed around tubular 100 (or vice versa). Serrated pin 172 is simply pushed into fairing 101 and support 149. Spring 129 is optional and is used to maintain pressure on support 149 and fairing 101 by serrated pin 172. Insert member 149 may include a piece of material bent or formed to match the fairing shape.

Still referring to FIG. 6, FIG. 6 illustrates that any combination of fasteners 121 may be used on a single fairing 101. Fasteners 121 may utilize bolts, screws, nuts, rivets, serrated pins, clamps, welds, chemical bonding, or other fasteners. Any type or size of spring 129 may be used for a fastener. While FIG. 6 shows a rubber type spring for spring 129, other spring types such as coiled springs may also be used. Insert member 149 may utilize any suitable size and shape.

Still referring to FIG. 6, fasteners 121, insert member 149, serrated pin 172, bolt and nut 171, and spring 129 may be of any desired size, shape or quantity, and may consist of any suitable material including, but not limited to, metal (including copper), plastic, composite, fiberglass, rubber/elastomer, or any combination thereof.

Figure 7:
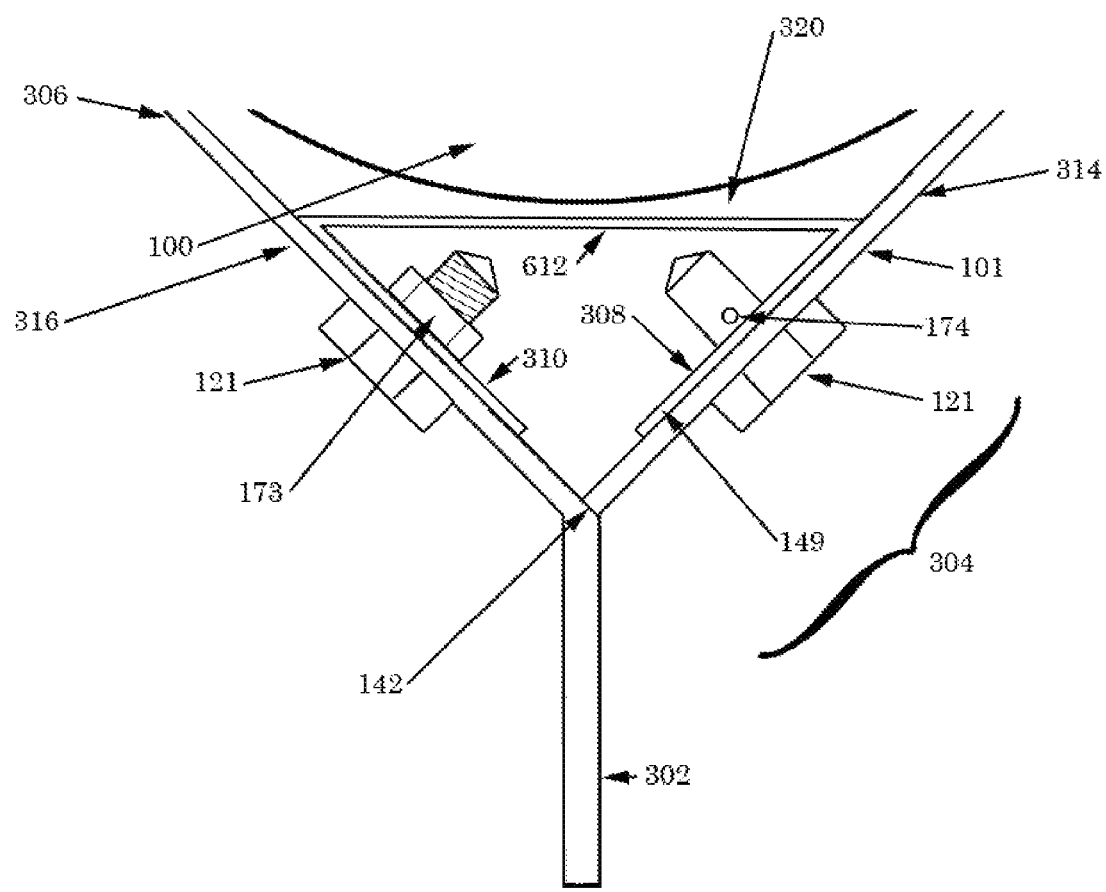
FIG. 7 is a top view of another embodiment of a fairing having an offset opening.

Referring now to FIG. 7, FIG. 7 illustrates an insert member similar to FIG. 6 but with an alternate fastening mechanism. For example, the insert member may be a U-shaped bracket that is attached by a fastener on one side and a pin using a cross-pin on the other side. Representatively, fairing 101 tail 302, stand-off region 304 and nose 306 is installed around tubular 100 using opening 142. Insert member 149 is attached to fairing 101 using fasteners 121. Left fastener 121 includes a bolt and nut 173 while right fastener 121 includes a pin and a hole 174 for a cross-pin.

Again referring to FIG. 7, the right fastener can include a pin or a bolt that is fully or partially threaded. Hole 174 is formed through the shank of fastener 121 and allows for a cross-pin to be inserted which keeps fairing 101 attached to insert member 149. The cross-pin that is inserted into hole 174 may consist of any suitable pin including, but not limited to, a lynch pin, a hitch pin, a spring pin, a dowel pin, a taper pin, a quick-release pin, a clevis pin, a carbineer, a shackle, or a locking pin. Any size, shape or number of pins may be used for a single block fastener and the pin(s) may be made of any suitable material including, but not limited to, metal (including copper), plastic, composite, fiberglass, or rubber/elastomer.

Figure 8A:
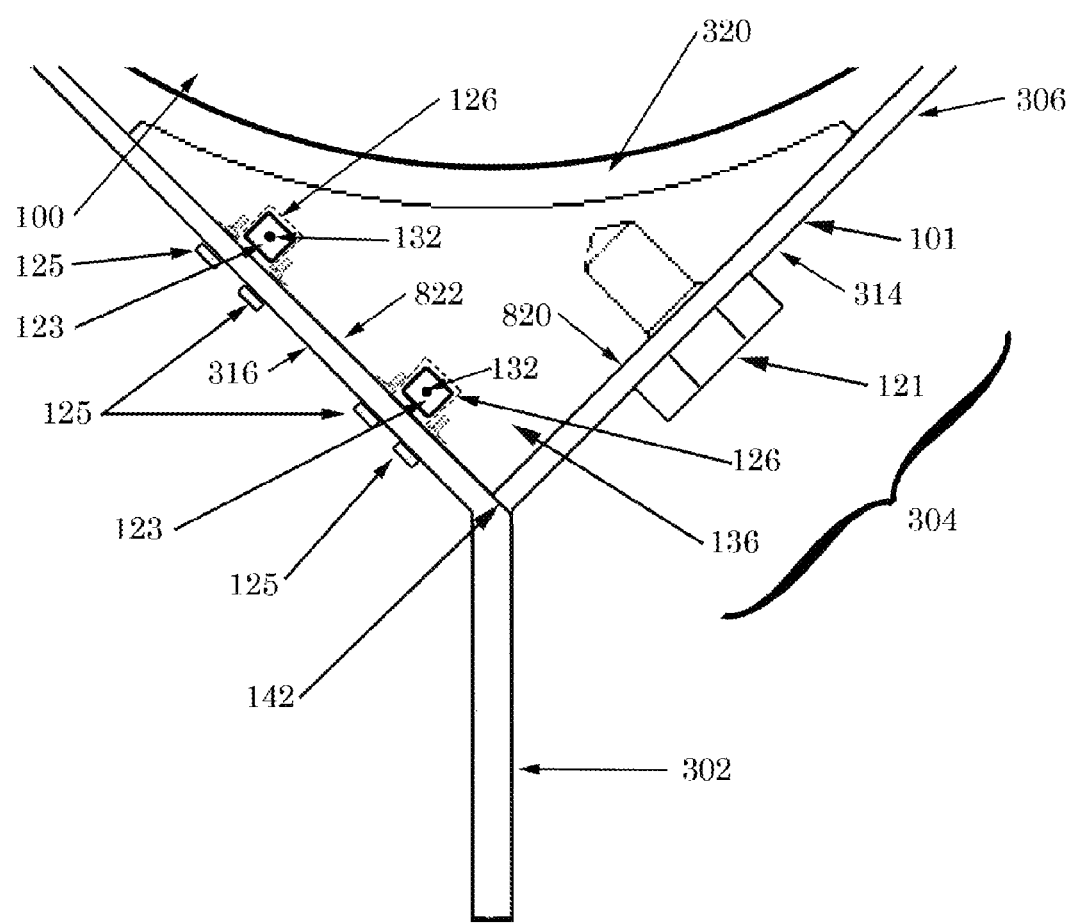
FIG. 8A is a top view of another embodiment of a fairing having an offset opening.

Referring now to FIG. 8A, FIG. 8A illustrates another embodiment of a fairing having an offset opening and insert member. In this embodiment, a channel may be formed through the insert member and a bracket is positioned below the channel with an opening for a pin to travel through both the insert member and the bracket to secure the fairing to the insert member. Representatively, fairing 101 may have a body portion which includes a nose 306 (which partially encircles an underlying tubular 100) and stand-off region 304 formed by a first side wall 314 and a second side wall 316 extending from nose 306. A tail 302 extends from stand-off region 304, for example, one or both of the ends of first and second side walls 314, 316. The opening 142 is formed between the ends of first side wall 314 and second side wall 316 and fairing 101 is installed around tubular 100 using opening 142. Insert member 136, in this embodiment, is a solid block that is attached alongside 820 to one side of fairing 101, for example first side wall 314, by fastener 121 (e.g., nut and bolt), and along another side 822 to second side wall 316, by a different type of fastener assembly. In particular, in this embodiment, side 822 of insert member 136 includes openings 123 formed therein. The second side wall 316 of the stand-off region 304 includes brackets 126 which can be aligned below openings 123. Fasteners 125 attach brackets 126 to second side wall 316 of fairing 101.

Again referring to FIG. 8A, the alignment of openings 123 and brackets 126 allow for a pin 132 to be inserted through openings 123 and brackets 126 to secure fairing 100 to insert member 136 on that side. Any number of openings 123 and brackets 126 may be utilized. Attachment methods other than fasteners, including but not limited to clamping, welding, chemical bonding, and riveting, may be used to attach brackets 126 to fairing 101.

Still referring to FIG. 8A, openings 123 and brackets 126 may be of any suitable size or shape. Brackets 126 may be made of any suitable material such as those listed above for other parts of this invention.

Figure 8B:
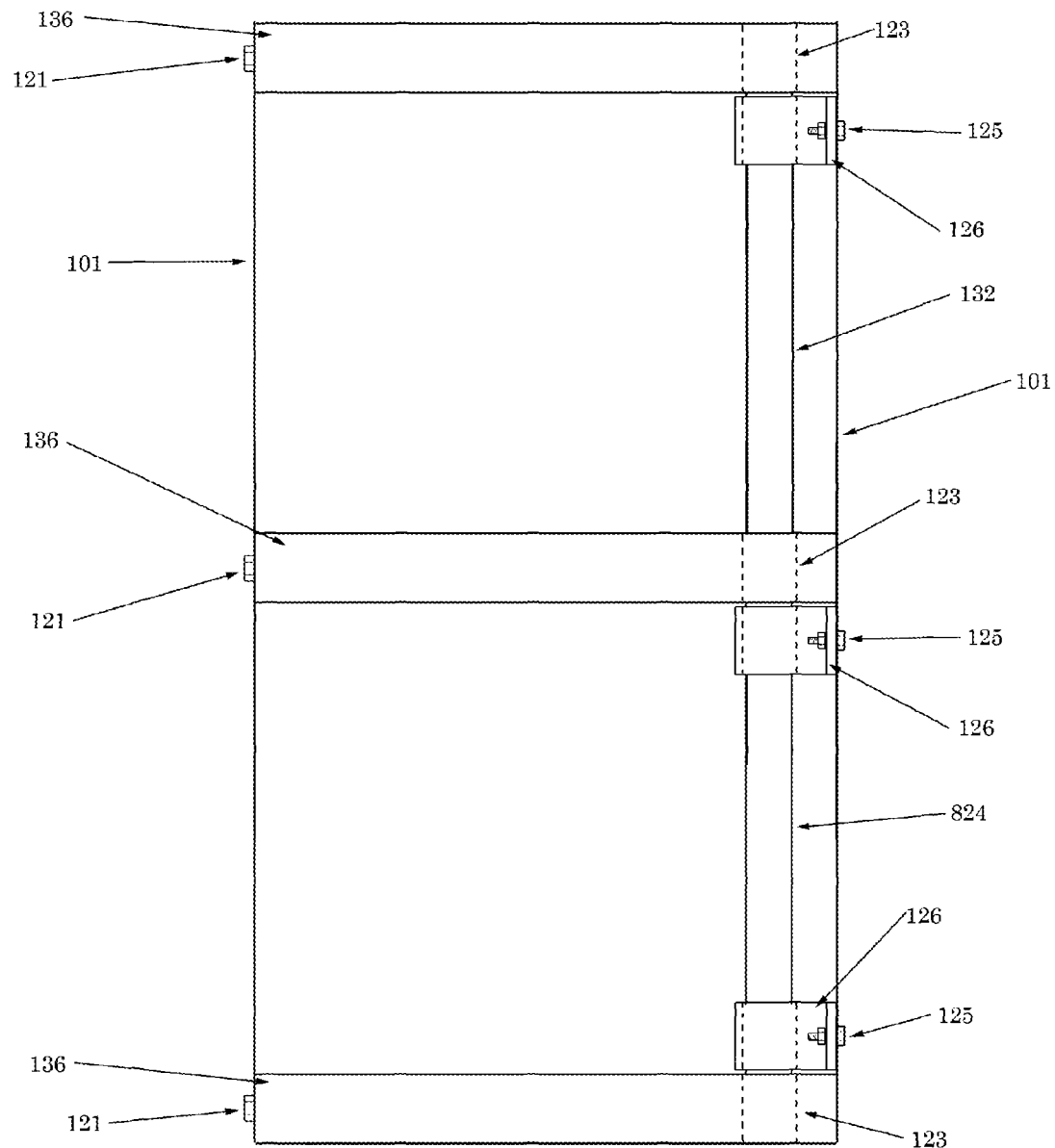
FIG. 8B is a side view of the fairing of FIG. 8A.

Referring now to FIG. 8B, FIG. 8B illustrates a cross sectional side view of FIG. 8B, showing a view that depicts three insert members 136 (e.g., solid blocks) attached to fairing 101 by fasteners 121 on one side, and brackets 126 attached to fairing 101 by fasteners 125 on the other side. Openings 123 in insert members 136 and the U-shaped bracket allow for pin 132 to be inserted through all three insert members 136 having brackets 126.

Again referring to FIG. 8B, any number of brackets 126, insert members 136, and pins 132 may be utilized. Brackets 126 may consist of other structures but at a minimum will have an opening for pin 132 and be attached (by any suitable means) to fairing 101. Pins 132 may have a cross-pin or other structure (e.g. nut or bolt head) and one or both ends, or somewhere along their length, that keeps them restrained from further sliding through openings 123 once pin 132 is installed. One or more insert members 136 may be recessed for the end termination of pin 132, so that the outsides of the end of insert members 136 are flat. Pins 132 may consist of any suitable structure including bolts, tubes and rods. Insert members 136 may be recessed to accommodate any end pieces attached to pins 132. Pins 132 may be secured by any suitable means including cross-pins, fasteners, and clamps or clips.

Still referring to FIG. 8B, insert members 136, brackets 126, and pin 132 may be made of any suitable size or shape and be of any suitable quantity. Insert members 136, brackets 126, and pin 132 may be made of any suitable material such as those listed above for other parts of this invention.

Figure 9:
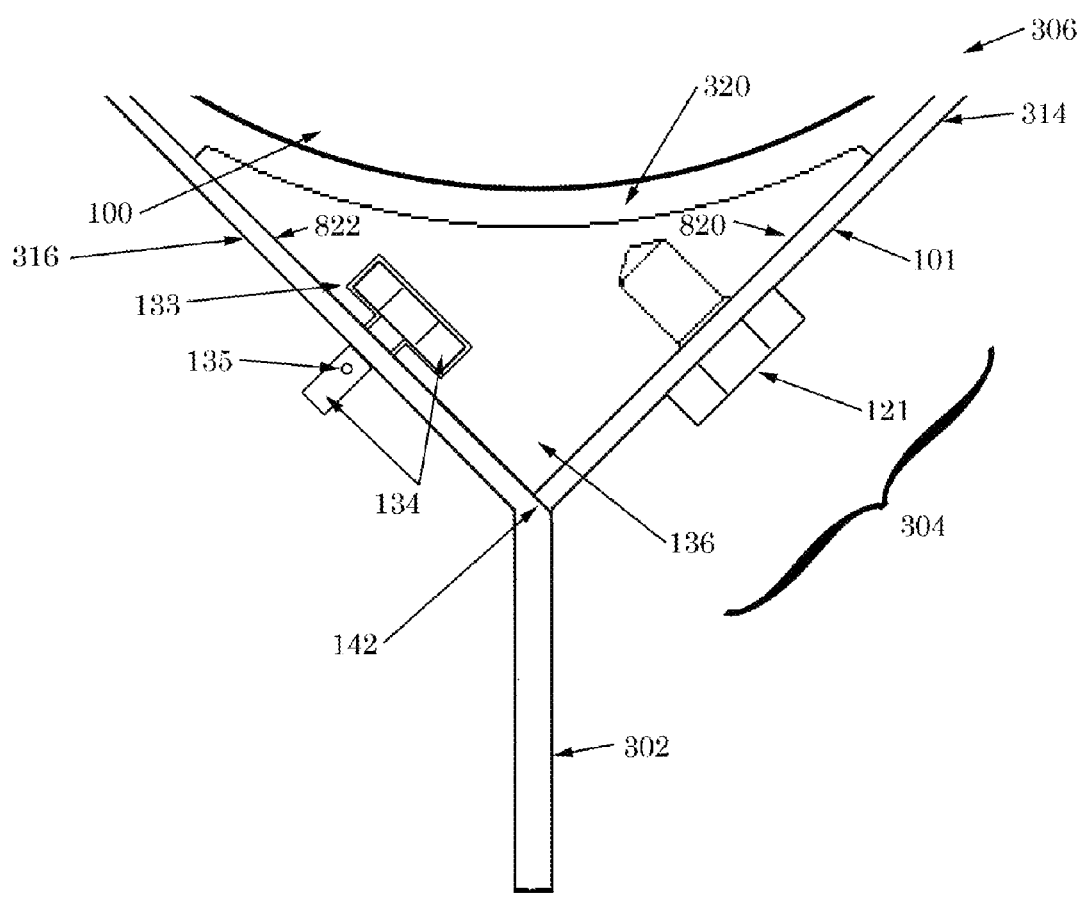
FIG. 9 is a top view of another embodiment of a fairing having an offset opening.

Referring now to FIG. 9, FIG. 9 illustrates another embodiment of an insert member, which is similar to the insert member disclosed in reference to FIG. 8A-FIG. 8B, but with a different fastening assembly. Similar to the previously discussed fairings, fairing 101 includes a body including a nose portion 306 from which a first side wall 314 and a second side wall 316 extend to form a stand-off region 304. Stand-off region 304 creates a channel between the tubular 100 and inner surface of fairing 101. Opening 142 is formed between ends of first side wall 314 and second side wall 316 and tail 302 extends from the ends of first and second side walls 314, 316. Fairing 101 is installed around tubular 100 using opening 142 which is between fairing tail 302 and stand-off region 304. In this embodiment, insert member 136 is a solid block having one side 820 attached to the first side wall 314 of fairing 101 by fastener 121 and another side 822 attached to the second side wall 316 by a different fastening assembly. In particular, this fastening assembly may include a slot 133 formed in insert member 136, which is dimensioned to receive a head of pin 134 such that the shaft of pin 134 can protrude through an opening in second side wall 316. The shaft portion of pin 134 may include opening 135 through which a cross-pin may be inserted.

Again referring to FIG. 9, pin 134 extends from insert member 136 through second side wall 316 of stand-off region 304 of fairing 101 so that when a cross-pin is inserted through opening 135, the fairing is secure on that side. Any number of slots 133, pins 134, openings 135, and cross-pins may be utilized.

Still referring to FIG. 9, slot 133, pin 134, and opening 135 may be of any suitable size or shape. Pin 134 may have other appurtenances to secure it into place. Any suitable structure may be used for pin 134 including, but not limited to, a bolt, a cable or rope, other fasteners such as carbineers, and/or a cable tie. More than one structure can be used for a given insert member 136 and more than one cross-pin may be used on pin 134. Pin 134 may be made of any suitable material such as those listed above for other parts of this invention.

Figure 10:
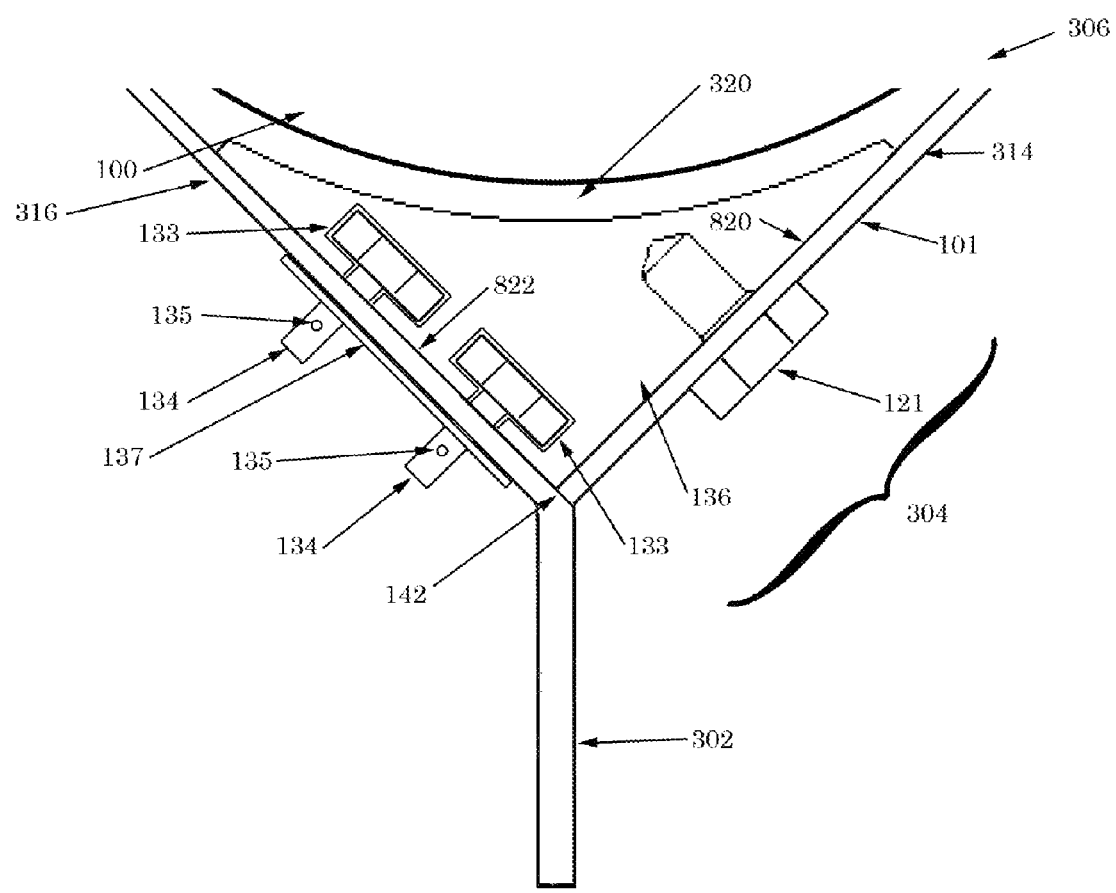
FIG. 10 is a top view of another embodiment of a fairing having an offset opening.

Referring now to FIG. 10, fairing 101 and insert member 136 are substantially similar to the fairing of FIG. 9 except in this embodiment, two fastener assemblies and a stiffening member are used to secure fairing 101 to one side of the fairing insert 136. For example, in this embodiment, openings are formed in the insert member for housing bolts or pins that extend through the fairing wall. The bolts or pins can be cross-pinned and an optional strength plate may be placed along a wall of the fairing wall through which the bolts or pins are inserted. In particular, insert member 136 is attached to one side of stand-off region 304 of fairing 101 by fastener 121. On the other side, slot 133 houses pins 134 which have openings 135. In addition, stiffening member 137 is attached to one or more pins 134 and acts as a stiffener to minimize deflection of fairing 101 or pins 134. Stiffening member 137 may be a substantially planar sheet of material, or of any size or shape suitable for stiffening, and may be attached to fairing 101 or pins 134 by any suitable means, and may be made of any suitable material such as those listed above for other parts of this invention. Stiffening member 137 may be attached to the outside or inside of fairing 101.

Figure 11:
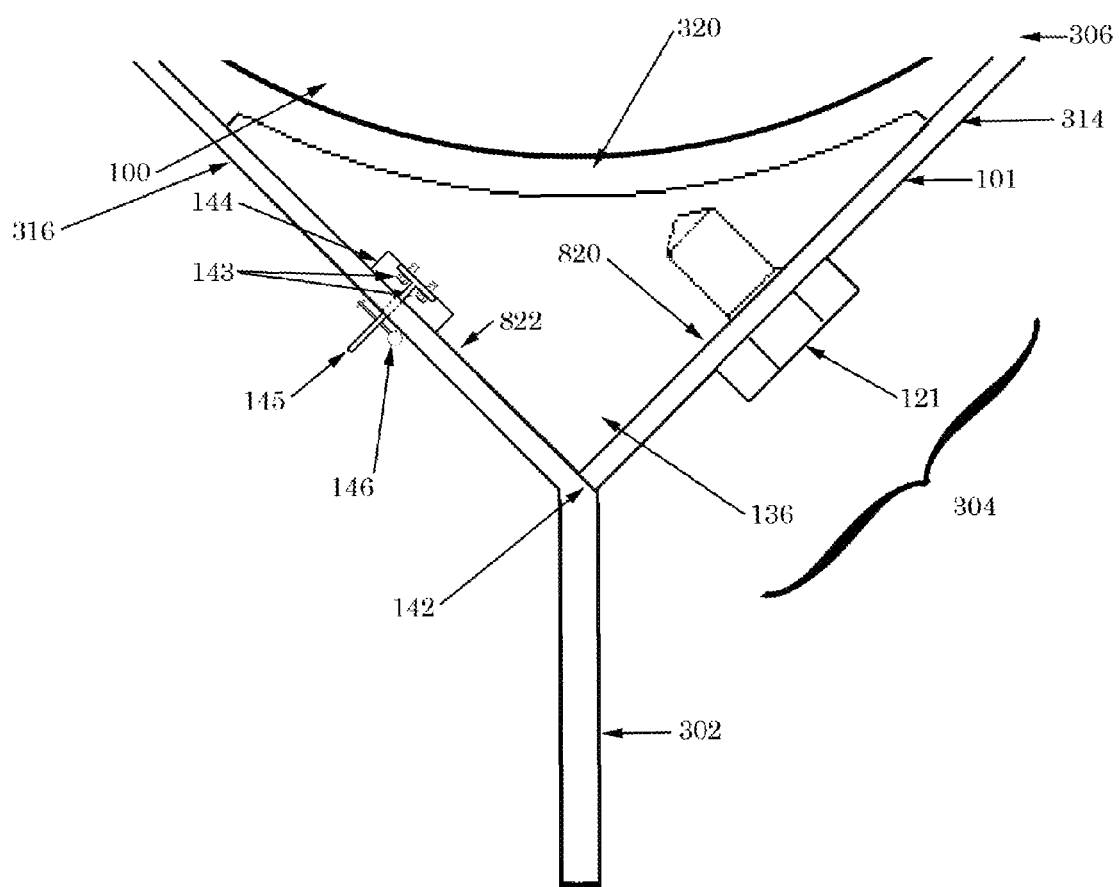
FIG. 11 is a top view of another embodiment of a fairing having an offset opening.

Referring now to FIG. 11, fairing 101 is installed around tubular 100 using opening 142, which is between fairing tail 302 and stand-off region 304 as previously discussed. Insert member 136 is a block attached to one side of fairing 101 by fastener 121. On the other side, slot 144 is formed in insert member 136 and bracket 145 is connected to insert member 136 by fasteners 143. Cross-pin 146 secures the side wall of stand-off region 304 of fairing 101 against insert member 136.

Again referring to FIG. 11, bracket 145 extends from insert member 136 through fairing 101 and is secured on the outside of fairing 101 by cross-pin 146. Any number of blocks, brackets, or cross-pins may be used. Bracket 145 may be of any suitable size or shape. Any type of pin may be used for cross-pin 146 including, but not limited to, bolts, nuts, screws, hitch pins, lynch pins, spring pins, quick release pins, taper or other types of pins, carbineers, split rings, clips, clamps, rope, cable, or cable ties. Bracket 145 and cross-pin 146 may be made of any suitable material such as those listed above for other parts of this invention.

FIG. 12-FIG. 17 illustrate various embodiments of a fairing having an offset opening that is along the fairing nose or front portion of the body.

Figure 12:
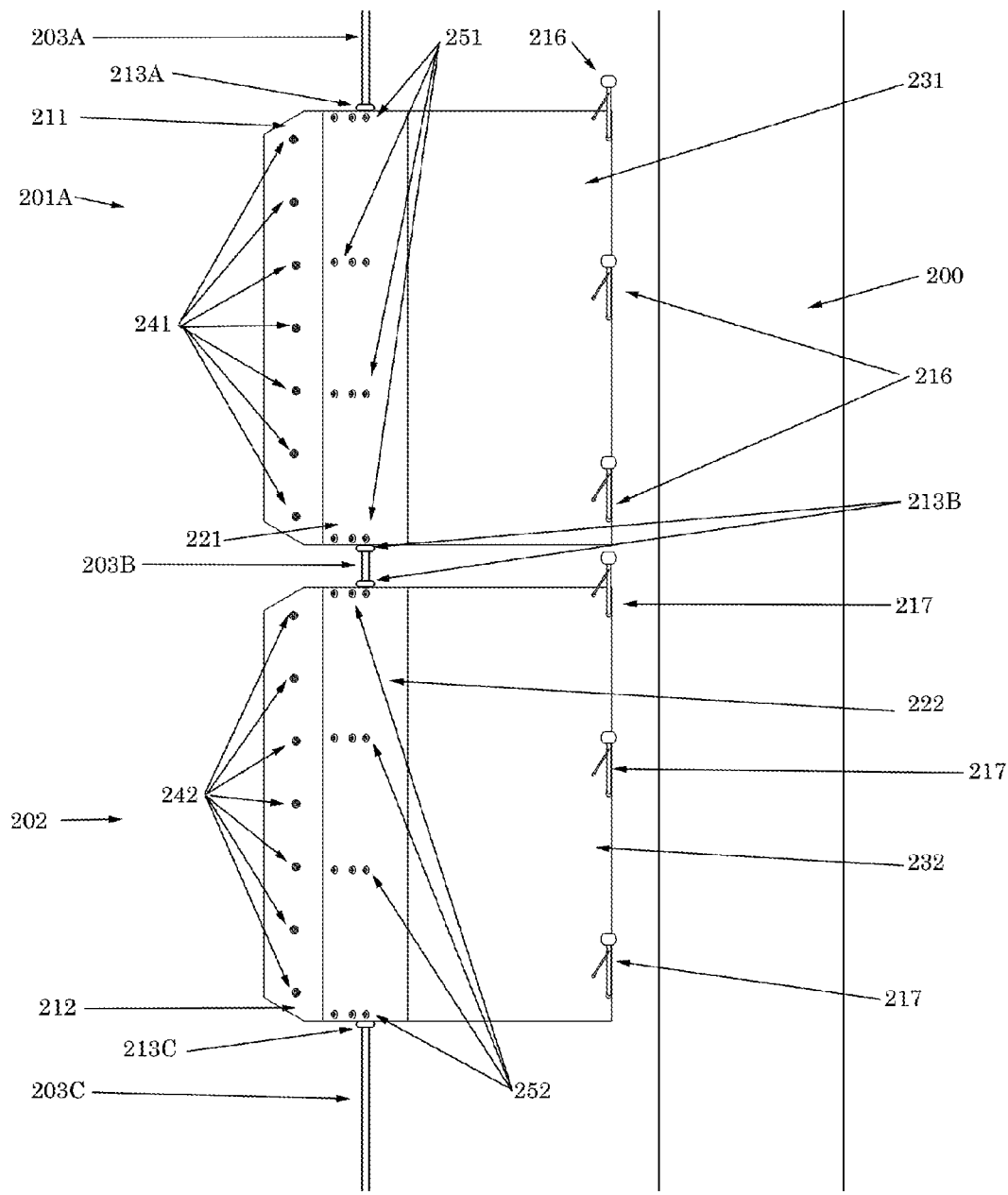
FIG. 12 is a side view of another embodiment of two fairings having offset openings.

FIG. 12 illustrates fairings 201A and 201B adjacent to tubular 200. Similar to the fairings previously discussed in reference to FIG. 3 to FIG. 11, fairing 201A may include a tail or flange 211, a stand-off region including tapered side walls 221, and nose 231. Similarly fairing 201B may include tail or flange 212, a stand-off region including tapered side walls 222, and nose 232. Fairings 201A and 201B may be held in place by lift line segments 203A, 203B, and 203C using clamps 213A, 213B, and 213C. Tail fasteners 241 and 242 attach opposing sides of flanges 211 and 212, respectively. Side wall fasteners 251 and 252 connect opposing sides for tapered side walls 221 and 222, respectively. Latches 216 and 217 connect opposing sides of the nose for fairings 201A and 201B, respectively.

Figure 16:
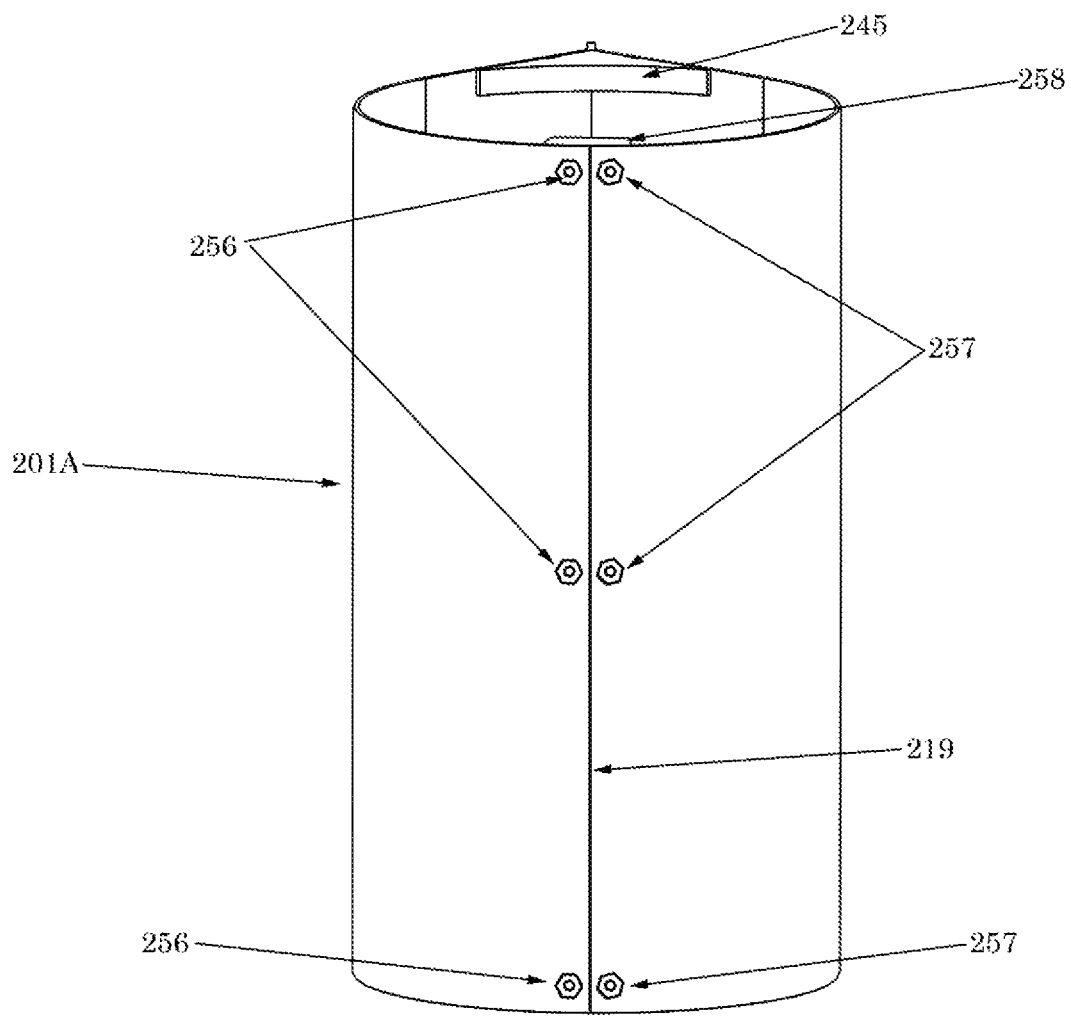
FIG. 16 is a front view of one embodiment of a fairing having an offset opening with a fastener type latching mechanism.
Figure 17:
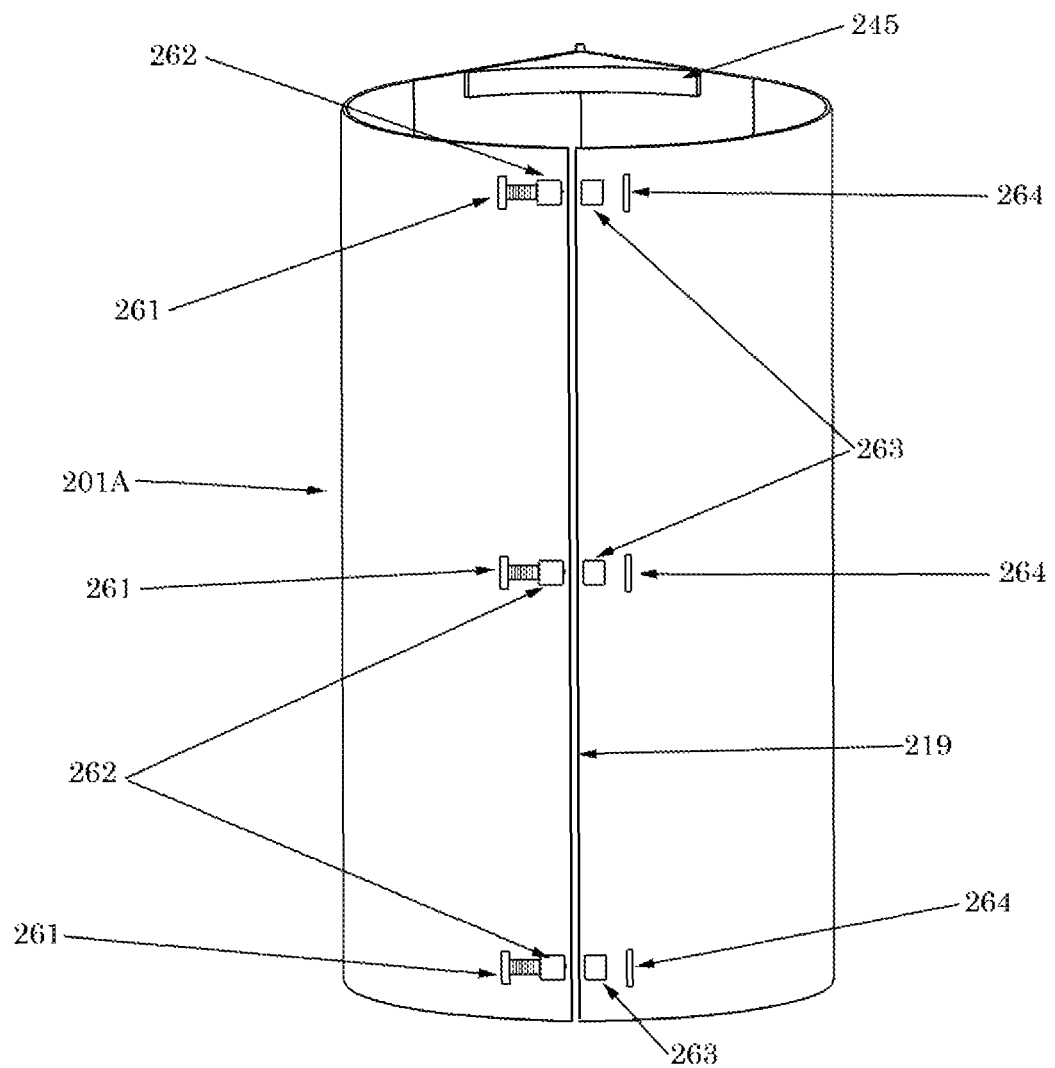
FIG. 17 is a front view of one embodiment of a fairing having an offset opening with a latching mechanism that uses serrated pins.

Again referring to FIG. 12, lift line segments 203A, 203B, and 203C are used to lower fairings 201A and 201B from the surface for installation onto tubular 200. Lift line segments may be discrete segments or part of a single continuous line that runs through fairings 201 and 201B. Lift line segments 203A, 203B, and 203C would normally be used only for retrofit applications and are not needed for surface installation. Not all clamps 213A, 213B, and 213C need to be present. While fairing 201A consists of flange 211, tapered side walls 221, and nose 231, these pieces may be continuous. In general, nose 231 is curved around the front portion of tubular 200 while tapered side walls 221 travel inward towards each other. If the walls contact, then a flange 211 may be formed but it is important to note that not all fairings have tapered side walls and not all fairings with tapered side walls have a flange 211. This is similar for fairing 201B consisting of flange 212, tapered side walls 222, and nose 232. Tail fasteners 241 and 242 may not be needed if flanges 211 and 212 do not consist of opposing sides (i.e. if there is not a split in them). Side wall fasteners 251 and 252 are typically used to connect some internal support structure, for example an insert member such as those previously discussed in reference to FIG. 3 to FIG. 11 (e.g., a "V" shaped insert or a solid block), to both sides of the tapered side walls. The insert member may be used for structural support but may be optional. Latches 216 and 217 may further be included and may be any suitable latch mechanism, some of which are presented herein. While FIG. 12-FIG. 17 are mostly intended for retrofit applications, these may also be used for pre-installed applications, especially with different latching mechanisms as shown in FIG. 16 and FIG. 17 (the latching mechanism shown in FIG. 17 is also quite suitable for retrofit applications).

Still referring to FIG. 12, fairings 201A and 201B may be of any suitable shape and any number of fairings may be used. Collars that clamp tightly to tubular 200, used for supporting the fairing weight and limiting their axial movement, may also be used between one or more fairings. Fairings 201A and 201B may have a nose portion 231 which is positioned around the front of tubular 200 as previously discussed. An opening in the nose 231 (shown in figures below) is used to place fairings 201A and 201B around tubular 200. Lift line segments 203A, 203B, and 203C may be of any suitable shape and multiple lines and line segments may be used. Lift line segments 203A, 203B, and 203C may run through any area of the fairing including the annulus, the tail, and the nose. Any number of tail fasteners 241 and 242 may be used and they may consist of any suitable type including, but not limited to, screws, bolts, nuts, rivets, staples, clips, chemical bonding, and clamps. Similarly, any number of side wall fasteners 251 and 252 may be used and they may consist of any suitable type including, but not limited to, screws, bolts, nuts, rivets, staples, clips, chemical bonding, and clamps. Any number of latches 216 and 217 may be used and they may be of any suitable size or shape.

Still referring to FIG. 12, all components listed above including fairings 201A and 201B may be made of any suitable material including, but not limited to, metal, plastic, rubber or other elastomer, ceramic, fiberglass, synthetic, and wood. Materials may be mixed and matched as needed, and various components may each be made of the same material or may be made of different materials.

Figure 13:
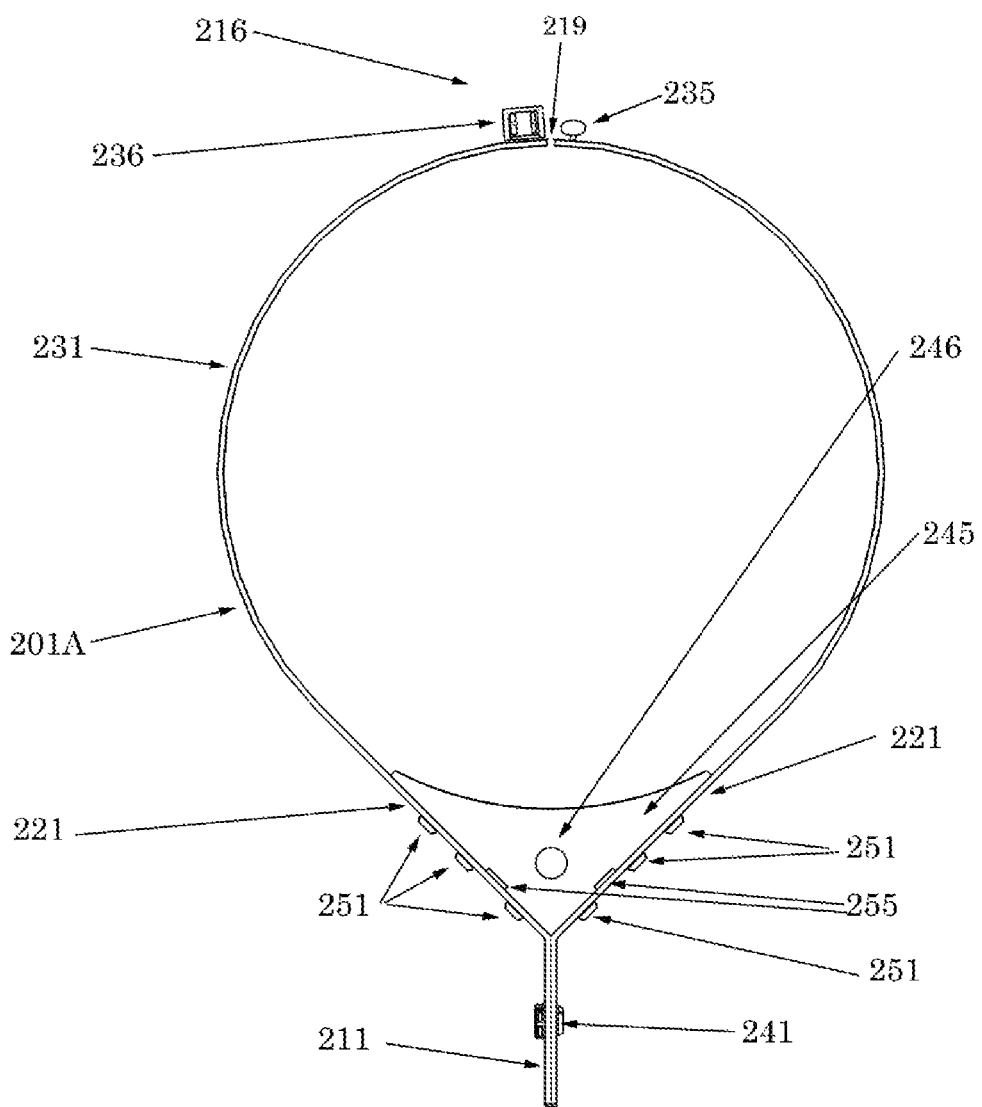
FIG. 13 is top view of one of the fairings of FIG. 12.

Referring now to FIG. 13, FIG. 13 illustrates a cross-sectional top end view of fairing 201A including tail or flange 211, the stand-off region formed by tapered side walls 221, and nose 231 which encircles the underlying tubular. Tail fastener 241 connects opposing sides of flange 211. Side wall fasteners 251 attach tapered side walls 221 to internal support 245 (e.g., an insert member as previously discussed in reference to FIG. 3-FIG. 11). Internal support 245 has lift line opening 246 and copper slots 255 through it. Nose 231 has nose opening 219 in it and opposing sides of nose 231 are connected using latch 216. Latch 216 may include a male piece 235 and a female piece 236.

Again referring to FIG. 13, during installation, fairing 201A is opened (which requires deformation of fairing 201A) at nose opening 219 and placed around the underlying tubular. Fairing 201A is then secured around the underlying tubular using latch 216. Optionally, one or more tail fasteners 241 or side wall fasteners 251 may be inserted during installation but generally these will be pre-installed so as to minimize installation time and simplify the overall installation process. In this embodiment, internal support 245 acts as a bearing surface for fairing 201A against an internal tubular so that the fairing stays relatively centralized with the nose adjacent to the tubular. Internal support 245 may be of any suitable shape and other structures such as struts, frames, or brackets may be substituted in place of internal support 245. Copper slot 255 is for placement of a copper piece (or a piece of another material) for inhibiting marine growth in the annulus between fairing 201A and the underlying tubular. Copper slot 245 and lift line opening 246 are optional.

Still referring to FIG. 13, nose opening 219 may be of any suitable width. Representatively, nose opening 219 may run the entire length of the fairing (i.e. from top to bottom). In other embodiments, nose opening 219 may run less than an entire length of the fairing. Nose 231 will normally be rounded but may be of other shapes. Tapered side walls 221, which form the stand-off region as previously discussed, may be tapered at any angle and may be curved. Tapered side walls 221 may consist of more than one segment on each side. Flange 211 may be of any suitable width or length and may be straight or curved. Flange 211 may be tapered at the ends of fairing 201. Latch 216 may consist of any suitable latching mechanism and any number of latches 216 may be used.

Still referring to FIG. 13, fairing 201A, tail fastener 241, side wall fasteners 251, internal support 245, and latch 216 (including both male piece 235 and female piece 236) may be of any suitable material including, but not limited to, metal, plastic, rubber or other elastomer, ceramic, fiberglass, synthetic, and wood. Materials may be mixed and matched as needed, and various components may each be made of the same material or may be made of different materials.

Figure 14A:
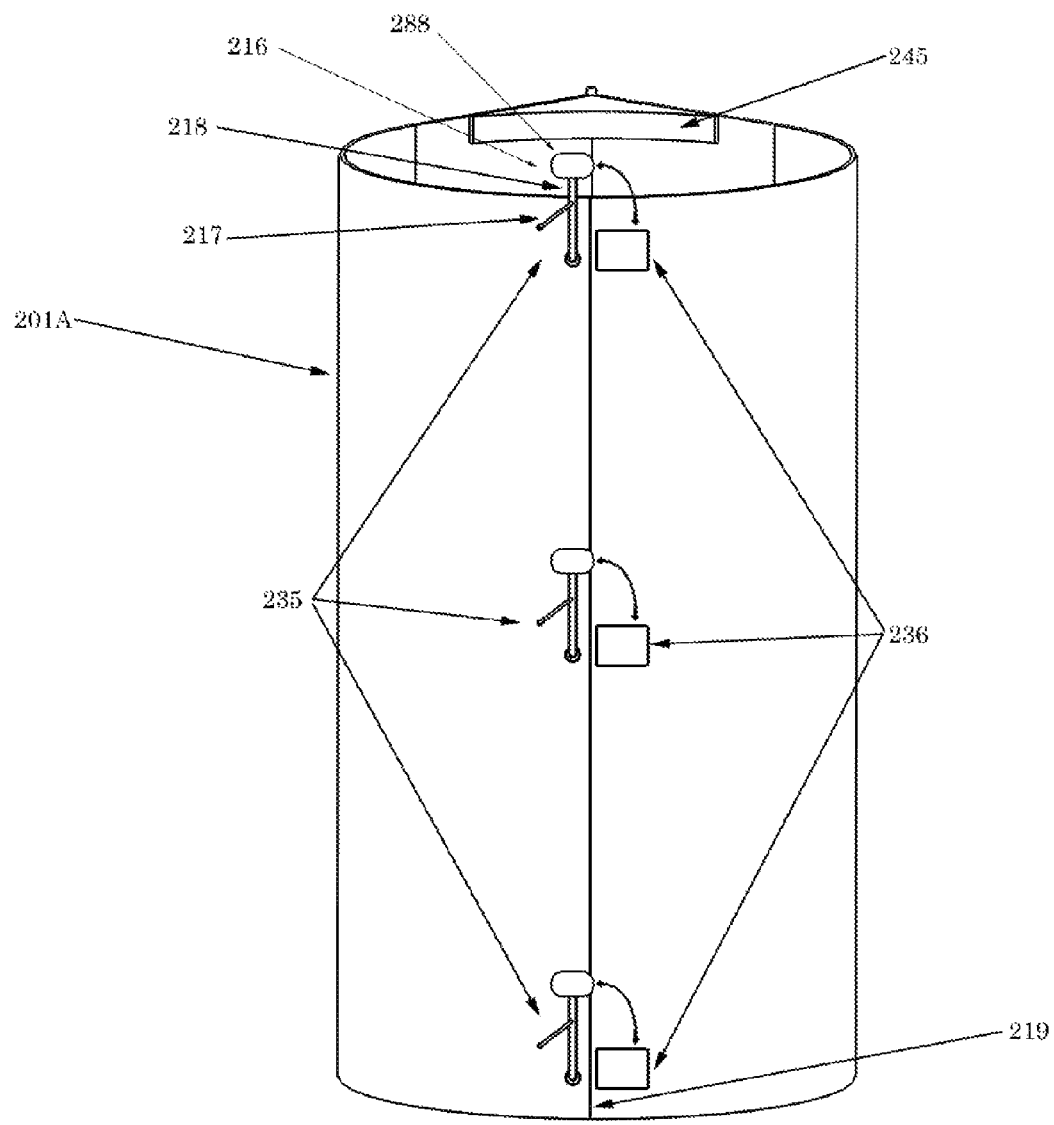
FIG. 14A is a front view of one of the fairings of FIG. 12.

Referring now to FIG. 14A, fairing 201A is shown with nose opening 219 and support block 245. Three latches 216 are shown which each include male pieces 235 and corresponding female pieces 236. Male piece 235 may include crossbar 218 which is attached to fairing 201A using an optional latch restraint 217, and latch head 288 which helps keep the latch secure.

Again referring to FIG. 14A, male piece 235 may be rotated into female piece 236 either manually, with a tool, or underwater with a diver or ROV. Optional latch restraint 217 is intended to keep male piece 235 from inadvertently being rotated into female piece 236 until installation, at which time optional latch restraint 217 may be intentionally removed or broken. While not shown, various components of latches 216 such as male pieces 235 may be connected via any suitable means so that multiple latches may be engaged at once.

Still referring to FIG. 14A, male pieces 235 (including crossbar 218, latch head 288, and optional latch restraint 217), and female pieces 236 may be of any suitable quantity, size, or shape, and may be made of any suitable material including, but not limited to, metal, plastic, rubber or other elastomer, ceramic, fiberglass, synthetic, and wood. Materials may be mixed and matched as needed, and various components may each be made of the same material or may be made of different materials.

Figure 14B:
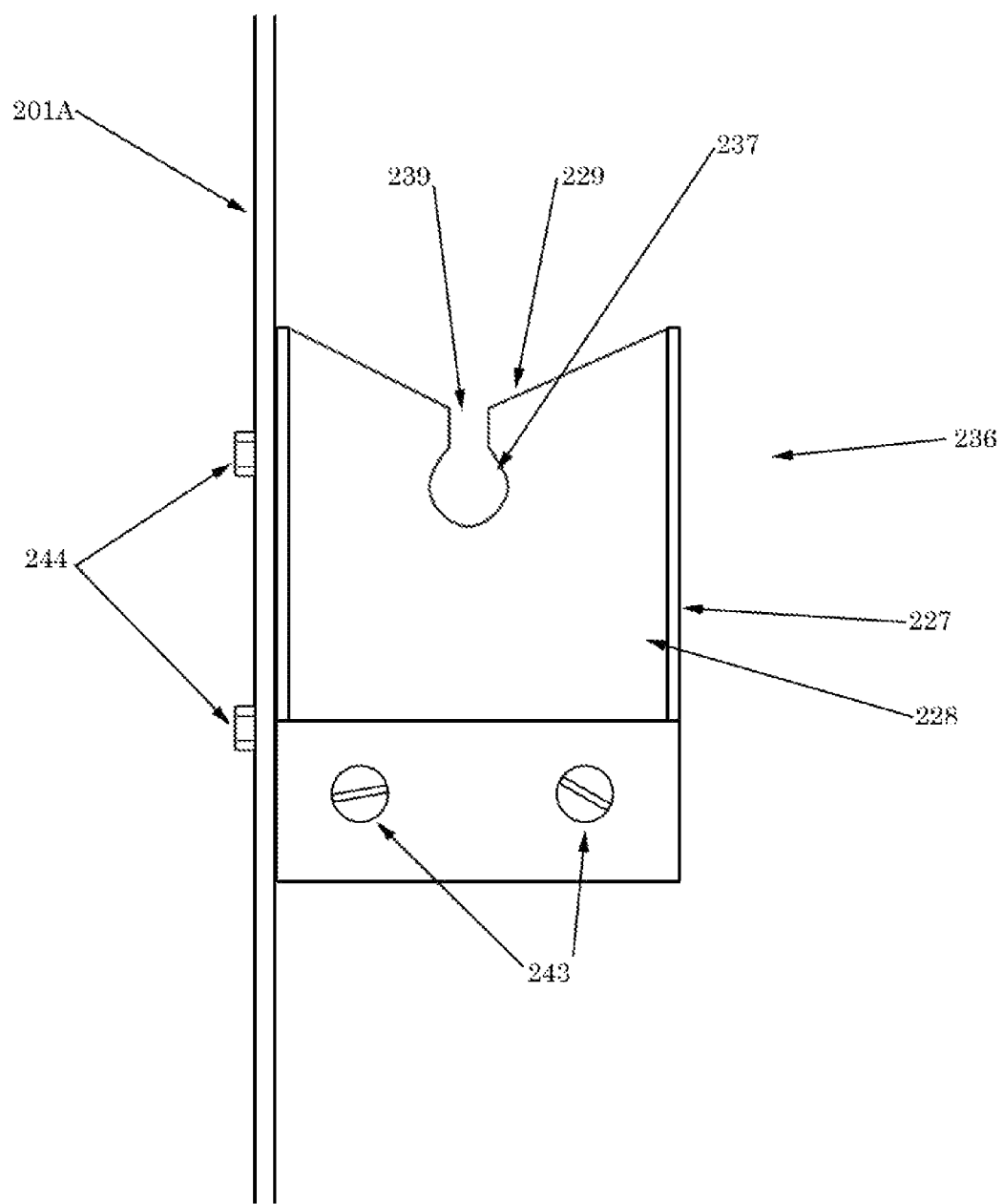
FIG. 14B is a magnified view of one embodiment of a female latch receptacle used in connection with one of the fairings of FIG. 12.

Referring now to FIG. 14B, FIG. 14B illustrates a magnified view of the latches 216 discussed in reference to FIG. 14A. In particular, from this view, it can be seen that latch female piece 236 is attached to fairing 201A using fasteners 244. Female piece 236 consists of housing 227 and latch receptacle 228, which includes tapered top 229, crossbar opening 239, and receptacle 237. Receptacle fasteners 243 optionally hold one or more latch receptacles 228 in place.

Again referring to FIG. 14B, as a male crossbar is lowered into female piece 236 it will encounter either crossbar opening 239 (if alignment is good) or tapered top 229. If it encounters tapered top 229 it will slide towards opening 239. A sufficient amount of force will then be required to lower the male crossbar through opening 239 into receptacle 237. Once the male crossbar is in receptacle 237 it will be more difficult for the male crossbar to inadvertently come out of receptacle 237. Other appurtenances may also be used to further lock the male crossbar into receptacle 237 but these are not shown. It is also quite possible that a tool will be required to apply sufficient force on the male crossbar to push it into receptacle 237. Note that fasteners 244 will often be countersunk into fairing 201A and thus would then not be visible in a drawing of this perspective.

Still referring to FIG. 14B, latch receptacle 228 may be of any suitable size, thickness or shape and more than one latch receptacle 228 may be used in a single housing 227. Tapered top 229 may have any suitable taper and crossbar opening 239 may have any suitable width for receiving the male crossbar. Receptacle 237 may be of any suitable shape but will typically be larger than the width of crossbar opening 239. Latch receptacle 228 may be of any suitable shape and may consist of multiple components that may be attached together by any suitable means.

Still referring to FIG. 14B, latch receptacle 228, housing 227, fasteners 244, and receptacle fasteners 243 may be made of any suitable material including, but not limited to, metal, plastic, rubber or other elastomer, ceramic, fiberglass, synthetic, and wood. Materials may be mixed and matched as needed, and various components may each be made of the same material or may be made of different materials.

Figure 14C:
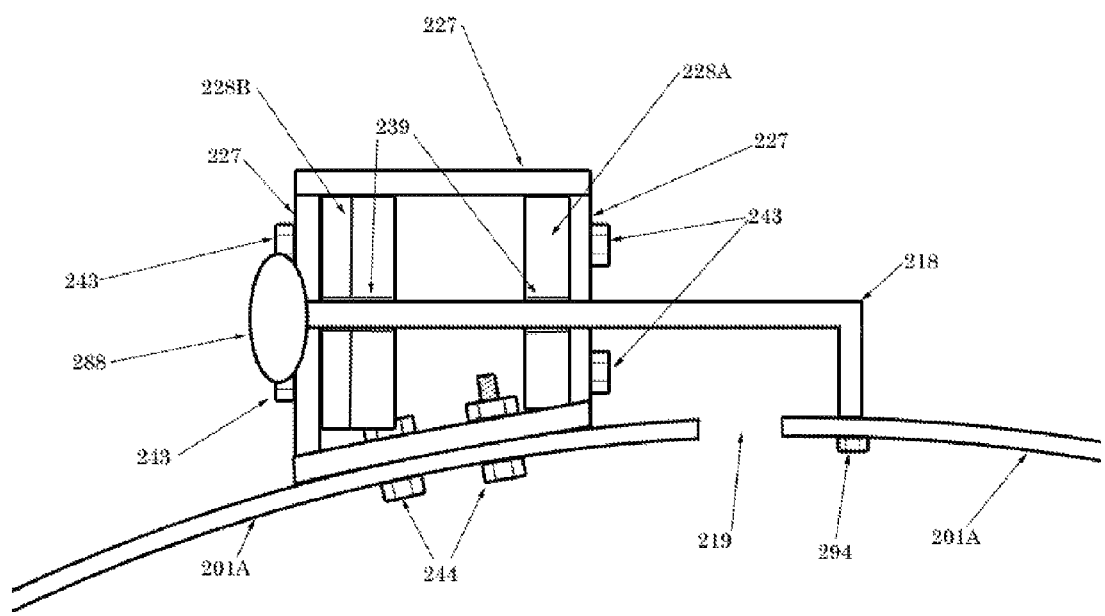
FIG. 14C is a magnified side view of one embodiment of a male and female latch receptacle used in connection with one of the fairings of FIG. 12.

Referring now to FIG. 14C, FIG. 14C illustrates a magnified view of the latches 216 discussed in reference to FIG. 14A. From this view, it can be seen that latch crossbar 218 is attached to one side of fairing 201A (to the left of opening 219) by fastener 294 and housing 227 is attached to another side of fairing 201A (to the right of opening 219) by fastener 244. Latch head 288 is attached to crossbar 218. Latch receptacles 228A and 228B are attached to housing 227 by fasteners 243. Latch receptacles 228A and 228B contain crossbar openings 239. Fairing 201A has nose opening 219 for attachment onto a tubular through that opening.

Again referring to FIG. 14C, crossbar 218 is inserted into crossbar openings 239 during installation. Latch receptacle 228B is angled towards the nose opening 219 and hence it appears wider than receptacle 228A. Latch receptacle 228B may also be curved to coincide with the path made by latch head 288 to facilitate ease of latching. Housing 227 may be of any suitable shape and be constructed using any suitable number of pieces and fasteners and thus is not restricted to what is shown in FIG. 14C. Housing 227 may also be molded into fairing 201A or made part of fairing 201A by any suitable means (e.g. heat welding or forming). All fasteners may, or may not, be countersunk regardless of what is depicted as an illustration in FIG. 14C.

Still referring to FIG. 14C, latch receptacles 228A and 228B and all other components may be of any suitable size or shape. All components may be made of any suitable material including, but not limited to, metal, plastic, rubber or other elastomer, ceramic, fiberglass, synthetic, and wood. Materials may be mixed and matched as needed, and various components may each be made of the same material or may be made of different materials.

Figure 15:
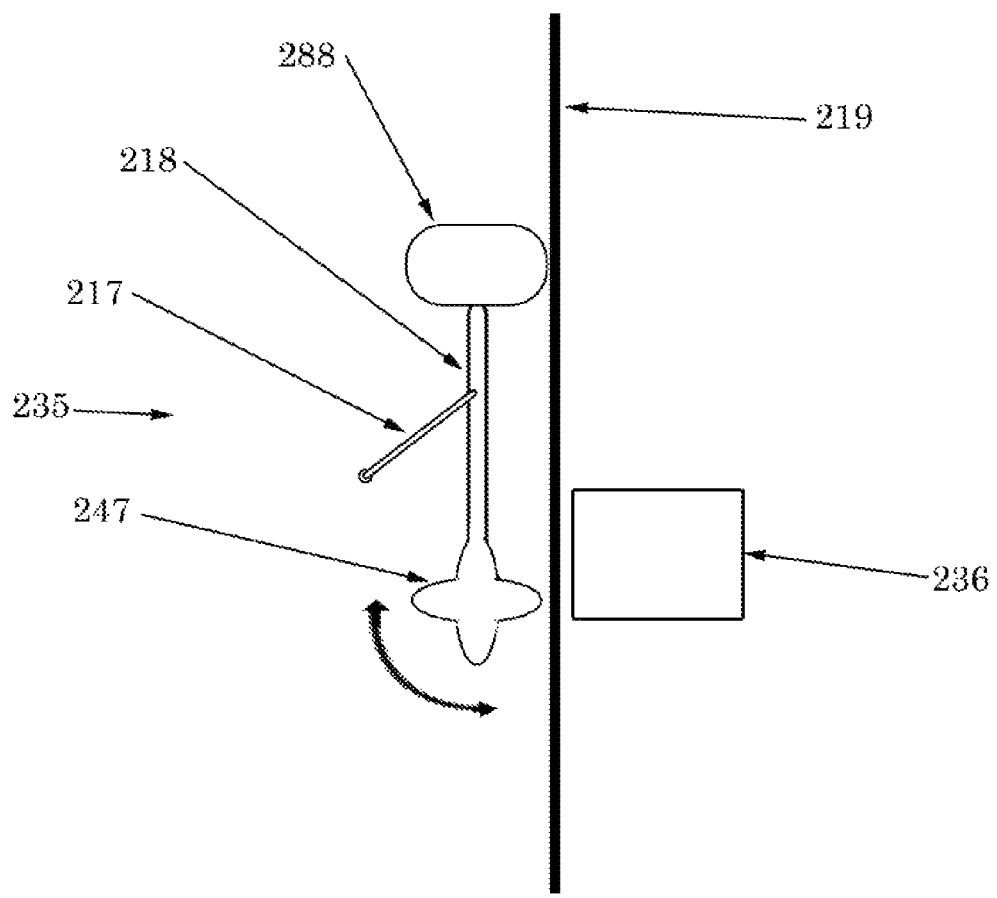
FIG. 15 is a front view of another embodiment of a latching mechanism used in connection with the fairing of FIG. 12.

Referring now to FIG. 15, fairing 201A is shown with nose opening 219 and a latch with male piece 235 and female piece 236. Male piece 235 contains crossbar 218, which is attached to fairing 201A by optional latch restraint 217. Latch head 288 is attached to crossbar 218 at one end and handle 247 is attached to crossbar 218 at the other end.

Again referring to FIG. 15, this latching mechanism is similar to that shown in FIG. 12-FIG. 14C, but with the addition of handle 247 used for turning crossbar 218 so that it rotates into the female piece 236. This allows a tool to easily interface with handle 247 and minimizes movement by an ROV or other installer. Handle 247 may be of any suitable size or shape and may be made of any suitable material.

Referring now to FIG. 16, fairing 201A has nose opening 219 and internal support 245. Nose connector 258 is used to close the fairing at nose opening 219 by attaching it to fairing 201A using left nose fasteners 256 and right nose fasteners 257.

Again referring to FIG. 16, fairing 201A is placed around a tubular with either left nose fasteners 256 in place, right nose fasteners 257 in place, or without left nose fasteners 256 and right nose fasteners 257 in place. Typically, one side of the nose fasteners will be in place, for instance left nose fasteners 256. After fairing 201A is placed around a tubular, right nose fasteners 257 may then be installed to secure fairing 201 around a tubular. Note that part of right nose fasteners 257 may be permanently mounted to nose connector 258. For example, screws may be permanently attached to nose connector 258 that comprise part of right nose fasteners 257. The screws are simply inserted into holes in fairing 201A and the screws are secured to fairing 201A using nuts. Other attachment mechanisms may also be used in place of left nose fasteners 256 or right nose fasteners 257 including, but not limited to, serrated pins, clamps, rivets, or clips. Any number of left nose fasteners 256 and right nose fasteners 257 may be used and various fastener or attachment types may be mixed. Internal support 245 may be of any suitable shape and may consist of one single piece or multiple segments along nose opening 219. Nose connector 258 may be attached to fairing 201A by any suitable means. Nose connector 258 may consist of more than one component.

Still referring to FIG. 16, nose connector 258, left nose fasteners 256, and right nose fasteners 257 may be made of any suitable material including, but not limited to, metal, plastic, rubber or other elastomer, ceramic, fiberglass, synthetic, and wood. Materials may be mixed and matched as needed, and various components may each be made of the same material or may be made of different materials.

Referring now to FIG. 17, fairing 201A has nose opening 219 and internal support 245. Nose connector 258 is used to close the fairing at nose opening 219 by attaching it to fairing 201A using serrated latch pins 261 which are held in place by male pin housings 262. Female pin housings 263 are across nose opening 219 from male pin housings 162. Support tabs 264 are located adjacent to female pin housings 263.

Again referring to FIG. 17, serrated pins 261 are inserted into female pin housings 263 by pushing serrated pins 261 into female pin housings 263 by sufficient force. Support tabs 264 allow for a place to grab fairing 201 during insertion of serrated pins 261 into female pin housings 263 or as an opposite side for a squeezing action between the head of serrated latch pins 261 and support tabs 264. In that regard, support tabs 264 must be located so that once serrated latch pins 261 are inserted into female pin housings 263 to obtain a sufficient connection, there is at least some clearance between serrated latch pins 261 and support tabs 264. Support tabs 264 may consist of any type of structure including blocks, handles, or knobs.

Again referring to FIG. 17, any number of serrated pins 261, male pin housings 262, female pin housings 263, and support tabs 264 may be located on a single fairing. For example, multiple male pin housings 262 and female pin housings 263 may be used for a single serrated pin 261, or multiple serrated pins 261 may be used for a single male pin housing 262 and a single female pin housing 263. Thus, any number or combination of serrated latch pins 261, male pin housings 262, female pin housings 263, and support tabs 264 may be used on a single fairing. Serrated latch pins 261, male pin housings 262, female pin housings 263, and support tabs 264 may also each be of any suitable geometry and thus variations in geometry are consistent with this specification. Other similar styled fasteners may be used such as a screw or nut in place of serrated latch pins 261. Cable ties may also be used to connect two housings, brackets, or other structures part of, or attached to fairing 201A on opposite sides of nose opening 219. Typically female pin housings 263 may have one or more nuts to receive a bolt, screw, or serrated latch pin within them.

Still referring to FIG. 17, serrated latch pins 261, male pin housings 262, female pin housings 263, and support tabs 264 may be made of any suitable material including, but not limited to, metal, plastic, rubber or other elastomer, ceramic, fiberglass, synthetic, and wood. Materials may be mixed and matched as needed, and various components may each be made of the same material or may be made of different materials.

The above aspects of this invention may be combined in any manner suitable to achieve the purposes of this invention. It is recognized that, various components may be mixed and matched and that the fairing opening may be closed by any suitable means including fastening, chemical bonding, clamping, welding, and riveting. It is also recognized that the internal support member may be of any suitable size, shape, or material and that copper (or other anti-fouling materials) may be used for all or part of the block for inhibiting marine growth on the fairing or adjacent structures (or any interfaces between structures).

In broad embodiment, the present invention is directed to a fairing that has an offset opening, for example, a side opening or a nose opening.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

What is claimed is:

1. A fairing comprising:
    a fairing body having a nose dimensioned to partially encircle an underlying tubular and having a fairing body axis;
    a stand-off region extending radially outward from the nose, wherein the stand-off region comprises a first side wall extending from one side of the nose and a second side wall extending from another side of the nose and toward the first side wall, wherein the first side wall and the second side wall form a substantially triangular shaped channel along an underlying tubular around which the nose is positioned;
    an insert member dimensioned to be inserted within the channel of the stand-off region, the insert member comprising a V shaped structure having a first arm and a second arm, the first arm having a first end and the second arm having a second end that joins the first end of the first arm to form an apex, and an outer surface of the first arm and the second arm rest along an inner surface of the stand-off region which faces an underlying tubular;
    a tail flange extending radially outward from the stand-off region, the tail flange having a single substantially planar and inseparable member comprising a first end adjacent the stand-off region and a second end radially outward to the first end; and
    an opening formed within one of the nose or the stand-off region, wherein the opening is parallel to the fairing body axis and the opening is modifiable between an open configuration and a closed configuration.

2. The fairing of claim 1 wherein the opening is formed between the first side wall or the second side wall of the stand-off region and the first end of the tail flange.

3. The fairing of claim 1 wherein the insert member is made of a metal.

4. The fairing of claim 1 wherein an area between the first arm and the second arm of the V shaped structure is solid.

5. The fairing of claim 1 wherein the first portion of the substantially planar member is attached to the V shaped structure at the apex.

6. The fairing of claim 1 wherein the insert member further comprises a base member extending between a second end of the first arm and a second end of the second arm, and wherein the base member rests along the underlying tubular when the nose of the fairing body is positioned along an underlying tubular.

7. The fairing of claim 1 further comprising a fastener assembly, wherein the fastener assembly is configured to secure at least one of the first side wall or the second side wall to the insert member.

8. The fairing of claim 7 wherein the fastener assembly comprises a bracket attached to the inner surface of at least one of the first side wall or the second side wall and the insert member comprises a bracket opening formed therein, wherein the bracket opening is dimensioned to receive the bracket and a pin for securing the bracket within the opening.

9. The fairing of claim 7 wherein the fastener assembly comprises a pin having a first end dimensioned to be received within a slot in the insert member and a second end dimensioned for insertion through at least one of the first side wall or the second side wall, wherein the second end comprises a laterally orientated channel through which a cross-pin is inserted once the second end is inserted through the at least one of the first side wall or the second side wall.

10. The fairing of claim 1 wherein the opening is formed within the nose.

11. The fairing of claim 10 further comprising a fastener assembly for holding the opening in the closed configuration, wherein the fastener assembly comprises a latching member and a receiving member for receiving and holding the latching member therein.

12. The fairing of claim 11 wherein (a) the latching member comprises a bar rotatably attached to a section of the fairing along one side of the opening and a latch head positioned at an end of the bar and (b) the receiving member comprises a housing attached to a section of the fairing along another side of the opening, the housing defining a receptacle dimensioned to receive and hold the bar and latch head therein.

13. The fairing of claim 11 wherein (a) the latching member comprises a serrated pin and a pin housing through which the serrated pin is operable to be advanced, the pin housing is attached to a section of the fairing along one side of the opening and (b) the receiving member comprises a pin receiving member attached to a section of the fairing along another side of the opening, the pin receiving member dimensioned to receive and retain the serrated pin therein.

* * * * *